US009299277B2

United States Patent
Jung et al.

(10) Patent No.: US 9,299,277 B2
(45) Date of Patent: Mar. 29, 2016

(54) BACKLIGHT UNIT AND DISPLAY DEVICE

(71) Applicants: Bupsung Jung, Seoul (KR); Hoon Hur, Seoul (KR)

(72) Inventors: Bupsung Jung, Seoul (KR); Hoon Hur, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 479 days.

(21) Appl. No.: 13/690,502

(22) Filed: Nov. 30, 2012

(65) Prior Publication Data

US 2014/0085344 A1 Mar. 27, 2014

(30) Foreign Application Priority Data

Sep. 21, 2012 (KR) ........................ 10-2012-0105487

(51) Int. Cl.
| | |
|---|---|
| G09G 5/10 | (2006.01) |
| G09F 13/04 | (2006.01) |
| G02F 1/1335 | (2006.01) |
| F21V 8/00 | (2006.01) |
| G09G 3/34 | (2006.01) |

(52) U.S. Cl.
CPC .............. *G09F 13/04* (2013.01); *G02B 6/0073* (2013.01); *G02B 6/0078* (2013.01); *G02F 1/133603* (2013.01); *G09G 3/342* (2013.01); *G02B 6/0036* (2013.01); *G02B 6/0055* (2013.01); *G02B 6/0061* (2013.01); *G02B 6/0083* (2013.01); *G02F 2001/133601* (2013.01); *G09G 2310/02* (2013.01)

(58) Field of Classification Search
CPC .................. G09G 3/3406; G09G 2320/0646; G09G 2340/0442; G09G 3/342; G09G 2310/02; G09F 13/04; G02B 6/0078; G02B 6/0073; G02B 6/0036; G02B 6/0061; G02B 6/0083; G02B 6/0055; G02F 1/133603; G02F 2001/133601

USPC .......................................................... 345/102
See application file for complete search history.

(56) References Cited

U.S. PATENT DOCUMENTS

| | | | | |
|---|---|---|---|---|
| 7,638,754 | B2 * | 12/2009 | Morimoto et al. ............ | 250/226 |
| 8,885,103 | B2 * | 11/2014 | Fujiwara et al. .............. | 348/564 |
| 2001/0046007 | A1 * | 11/2001 | Greene et al. .................. | 349/73 |
| 2006/0061539 | A1 * | 3/2006 | Song et al. ..................... | 345/102 |
| 2006/0146005 | A1 * | 7/2006 | Baba et al. ..................... | 345/102 |
| 2008/0150884 | A1 | 6/2008 | Ito ................................. | 345/102 |

(Continued)

FOREIGN PATENT DOCUMENTS

| | | |
|---|---|---|
| CN | 101529326 A | 9/2009 |
| CN | 101836246 A | 9/2010 |

OTHER PUBLICATIONS

European Search Report dated Jan. 7, 2014 issued in Application No. 12 00 8046.

(Continued)

*Primary Examiner* — Aneeta Yodichkas
*Assistant Examiner* — Joseph Fox
(74) *Attorney, Agent, or Firm* — Ked & Associates, LLP

(57) ABSTRACT

A display device includes a display panel for displaying an image, a backlight unit positioned in the rear of the display panel, and a back cover positioned in the rear of the backlight unit. The backlight unit includes a substrate part including a plurality of substrates, and a plurality of light sources disposed on each of the plurality of substrates. A transverse width and a longitudinal width of at least one of the plurality of substrates are different from a transverse width and a longitudinal width of at least one of the remaining substrates, respectively.

17 Claims, 30 Drawing Sheets

(56) References Cited

U.S. PATENT DOCUMENTS

2010/0002025 A1* 1/2010 Jacobs et al. .................. 345/690
2010/0207866 A1* 8/2010 Kunii ............................ 345/102
2010/0220047 A1   9/2010 Adachi ......................... 345/102
2011/0050556 A1* 3/2011 Bae et al. ..................... 345/102
2011/0242492 A1* 10/2011 Jung et al. ..................... 353/30

OTHER PUBLICATIONS

Chinese Office Action dated Apr. 27, 2015 issued in Application No. 201310126408.9 (Original Office Action and English Translation).

* cited by examiner (A)

(B)

BACKLIGHT UNIT AND DISPLAY DEVICE

This application claims the benefit of Korean Patent Application No. 10-2012-0105487 filed on Sep. 21, 2012, the entire contents of which is incorporated herein by reference for all purposes as if fully set forth herein.

BACKGROUND OF THE INVENTION

1. Field of the Invention

Embodiments of the invention relate to a backlight unit and a display device.

2. Discussion of the Related Art

With the development of the information society, various demands for display devices have been increasing. Various display devices, such as liquid crystal displays (LCDs), plasma display panels (PDPs), electroluminescent displays (ELDs), and vacuum fluorescent displays (VFDs), have been recently studied and used to meet various demands for the display devices. Among the display devices, a liquid crystal display panel of the liquid crystal display includes a liquid crystal layer, and a thin film transistor (TFT) substrate and a color filter substrate that are positioned opposite each other with the liquid crystal layer interposed therebetween. The liquid crystal display panel displays an image using light provided by a backlight unit of the liquid crystal display.

SUMMARY OF THE INVENTION

In one aspect, there is a backlight unit including a substrate part including a plurality of substrates, and a plurality of light sources disposed on each of the plurality of substrates, wherein a transverse width and a longitudinal width of at least one of the plurality of substrates are different from a transverse width and a longitudinal width of at least one of the remaining substrates, respectively.

The substrate, which has a maximum length in a horizontal direction among the plurality of substrates, is positioned on a first long side of the substrate part and a second long side opposite the first long side.

The number of light sources disposed on at least one of the plurality of substrates is different from the number of light sources disposed on at least one of the remaining substrates.

The substrate, which has the minimum number of light sources among the plurality of substrates, is positioned on the corner of the substrate part.

The substrate, which has a maximum length in a vertical direction among the plurality of substrates, is positioned on a first short side of the substrate part and a second short side opposite the first short side.

The light sources are arranged on a first substrate of the plurality of substrates in A×B matrix form, where A and B are a natural number, wherein the light sources are arranged on a second substrate of the plurality of substrates in C×D matrix form, where C is a natural number different from 'A' and D is a natural number different from 'B'.

The number of light sources disposed on the first substrate is the same as the number of light sources disposed on the second substrate.

The substrate part includes: a first substrate positioned on a first long side of the substrate part; a second substrate positioned on a second long side opposite the first long side; a third substrate positioned on a first short side adjacent to the first and second long sides; a fourth substrate positioned on a second short side opposite the first short side; and a fifth substrate positioned between the first substrate and the second substrate and between the third substrate and the fourth substrate.

The number of light sources disposed on the fifth substrate is more than the number of light sources disposed on each of the first to fourth substrates.

The fifth substrate is divided into a plurality of sub-substrates, and at least one light source is disposed on each of the plurality of sub-substrates.

The number of light sources disposed on at least one of the plurality of sub-substrates is different from the number of light sources disposed on at least one of the remaining sub-substrates.

A ratio of a transverse width to a longitudinal width of the substrate part is about 16:9, wherein a ratio of a transverse width to a longitudinal width of the substrate part is about 21:9 in a state where the first and second substrates are removed in the substrate part.

In another aspect, there is a display device including a display panel configured to display an image, a backlight unit positioned in the rear of the display panel, and a back cover positioned in the rear of the backlight unit, wherein the backlight unit includes a substrate part including a plurality of substrates, and a plurality of light sources disposed on each of the plurality of substrates, wherein a transverse width and a longitudinal width of at least one of the plurality of substrates are different from a transverse width and a longitudinal width of at least one of the remaining substrates, respectively.

The number of light sources disposed on at least one of the plurality of substrates is different from the number of light sources disposed on at least one of the remaining substrates.

The substrate part includes: a first substrate positioned on a first long side of the substrate part; a second substrate positioned on a second long side opposite the first long side; a third substrate positioned on a first short side adjacent to the first and second long sides; a fourth substrate positioned on a second short side opposite the first short side; and a fifth substrate positioned between the first substrate and the second substrate and between the third substrate and the fourth substrate.

The number of light sources disposed on the fifth substrate is more than the number of light sources disposed on each of the first to fourth substrates.

The fifth substrate is divided into a plurality of sub-substrates, and at least one light source is disposed on each of the plurality of sub-substrates.

The number of light sources disposed on at least one of the plurality of sub-substrates is different from the number of light sources disposed on at least one of the remaining sub-substrates.

A ratio of a transverse width to a longitudinal width of the substrate part is about 16:9, wherein a ratio of a transverse width to a longitudinal width of the substrate part is about 21:9 in a state where the first and second substrates are removed in the substrate part.

When video data having a screen ratio of a transverse length to a longitudinal length of 4:3 is supplied to the display panel, the third and fourth substrates are turned off, wherein when video data having a screen ratio of a transverse length to a longitudinal length of 21:9 is supplied to the display panel, the first and second substrates are turned off.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
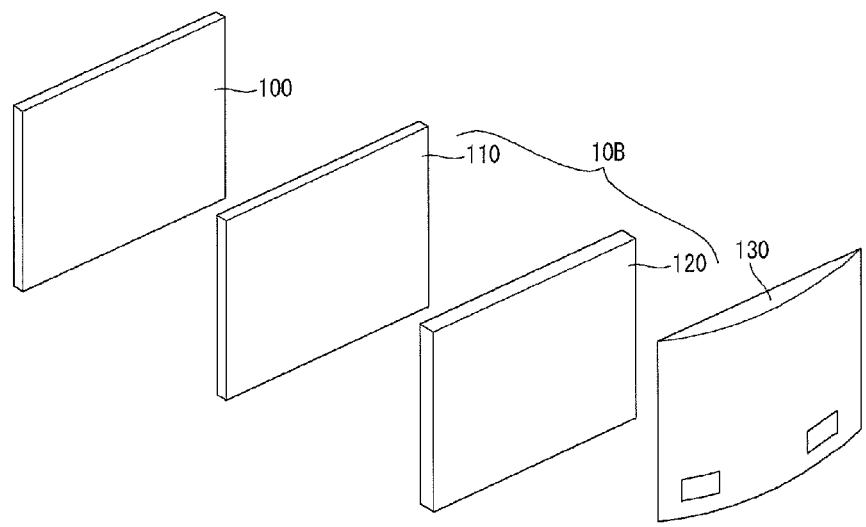
FIGS. 1 to 8 illustrate configuration of a display device according to an example embodiment of the invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

FIGS. 1 to 8 illustrate configuration of a display device according to an example embodiment of the invention.

As shown in FIG. 1, a display device according to an example embodiment of the invention may include a display panel 100, a backlight unit 10B including an optical sheet 110 and a light source part 120, and a back cover 130.

The optical sheet 110 may be positioned between a back substrate of the display panel 100 and the back cover 130

The backlight unit 10B may be disposed in the rear of the display panel 100. Although not shown, the backlight unit 10B may further include a frame as well as the light source part 120.

Various types of light sources may be used in the light source part 120 according to the embodiment of the invention. For example, the light source may be one of a light emitting diode (LED) chip and a LED package having at least one LED chip. In this instance, the light source may be a colored LED emitting at least one of red, green, and blue light or a white LED.

Although the embodiment of the invention describes a direct type backlight unit as an example of the backlight unit 10B, other types of backlight units may be used.

The back cover 130 may be positioned in the rear of the backlight unit 10B. The back cover 130 may protect the backlight unit 10B and other parts of the display device from an impact or a pressure applied from the outside.

Figure 2:
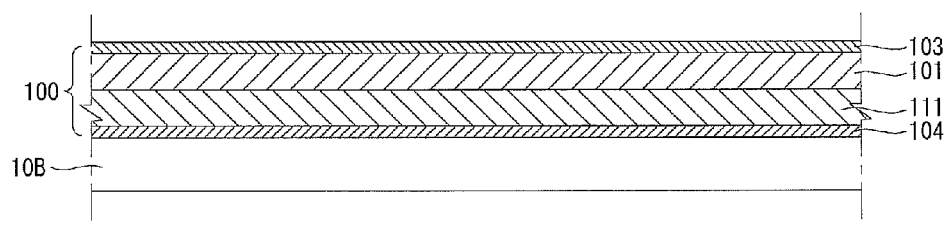

FIG. 2 is a schematic cross-sectional view of the display device according to the embodiment of the invention.

As shown in FIG. 2, the display device may include the display panel 100 and the backlight unit 10B.

The display panel 100 may include a color filter substrate 101 and a thin film transistor (TFT) substrate 111, that are positioned opposite each other and attached to each other to form a uniform cell gap therebetween. A liquid crystal layer (not shown) may be formed between the color filter substrate 101 and the TFT substrate 111. Hereinafter, the color filter substrate 101 may be referred to as a front substrate, and the TFT substrate 111 may be referred to as a back substrate.

The color filter substrate 101 includes a plurality of pixels each including red (R), green (G), and blue (B) subpixels and may generate a red, green, or blue image when light is applied to the pixels.

In the embodiment of the invention, each of the pixels includes the red, green, and blue subpixels. Other structures may be used for the pixel. For example, each pixel may include red, green, blue, and white (W) subpixels.

The TFT substrate 111 may serve as a switching element and may switch on and off a pixel electrode (not shown).

The liquid crystal layer is comprised of liquid crystal molecules. The arrangement of the liquid crystal molecules may vary depending on a voltage difference between a pixel electrode (not shown) and a common electrode (not shown). Hence, light provided by the backlight unit 10B may be incident on the color filter substrate 101 based on changes in the arrangement of the liquid crystal molecules of the liquid crystal layer.

An upper polarizing plate 103 and a lower polarizing plate 104 may be respectively positioned on an upper surface and a lower surface of the display panel 100. More particularly, the upper polarizing plate 103 may be positioned on an upper surface of the color filter substrate 101, and the lower polarizing plate 104 may be positioned on a lower surface of the TFT substrate 111.

The display device may further include a gate driver (not shown) and a data driver (not shown), each of which generates driving signals for driving the display panel 100.

Since the above-described configuration of the display panel 100 is merely one example, other configurations may be used for the display panel 100.

In the embodiment of the invention, the backlight unit 10B may have the structure in which a plurality of functional layers are sequentially stacked. At least one of the plurality of functional layers may include the light source part 120 including a plurality of light sources.

Further, a bottom cover (not shown), on which the backlight unit 10B is stably placed, may be provided under the backlight unit 10B.

The display panel 100 according to the embodiment of the invention may be divided into a plurality of regions. Brightness (i.e., brightness of the corresponding light source) of light emitted from a region of the backlight unit 10B corresponding to each of the divided regions of the display panel 100 is adjusted based on a gray peak value or a color coordinate signal of each divided region. Hence, a luminance of the display panel 100 may be adjusted.

For this, the backlight unit 10B may be divided into a plurality of division driving regions respectively corresponding to the divided regions of the display panel 100 and may be division-driven. The division drive of the backlight unit 10B will be described in detail below.

Figure 3:
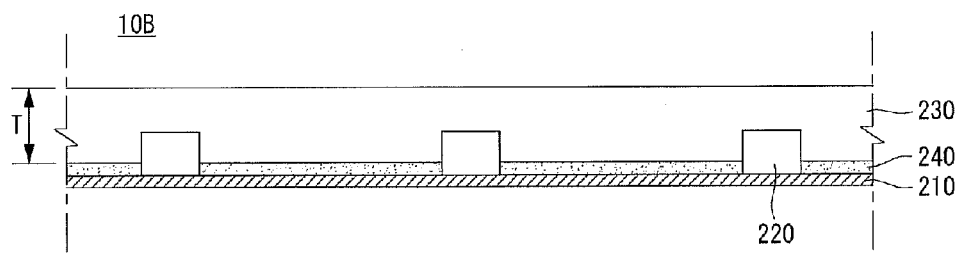

FIG. 3 is a cross-sectional view of the light source part of the backlight unit.

As shown in FIG. 3, the light source part 120 of the backlight unit 10B may include a substrate part 210, a plurality of light sources 220, a resin layer 230, and a reflection layer 240.

The light sources 220 may be formed on the substrate part 210, and the resin layer 230 may be formed on the light sources 220 and the reflection layer 240. Preferably, the resin layer 230 may be formed on the substrate part 210 so as to cover the light sources 220.

Although not shown, the substrate part 210 may include a plurality of substrates. This will be described in detail below.

A connector (not shown) and an electrode pattern (not shown) for connecting the light sources 220 to one another may be formed on the substrate part 210. For example, a carbon nanotube electrode pattern (not shown) for connecting the light sources 220 to the connector may be formed on an upper surface of at least one substrate included in the substrate part 210. The connector may be electrically connected to a power supply unit (not shown) for supplying electric power to the light sources 220.

At least one substrate included in the substrate part 210 may be a printed circuit board (PCB) formed of polyethylene terephthalate (PET), glass, polycarbonate (PC), or silicon. Further, at least one substrate included in the substrate part 210 may be a film substrate.

The light source 220 may be one of a light emitting diode (LED) chip and a LED package having at least one LED chip. In the embodiment of the invention, the LED package is described as an example of the light source 220.

The light source 220 may be configured by a colored LED emitting at least one of red light, green light, blue light, etc. or a white LED emitting white light. In addition, the colored LED may include at least one of a red LED, a blue LED, and a green LED. The disposition and emission light of the light emitting diode may be variously changed within a technical scope of the embodiment.

The resin layer 230 positioned on the substrate part 210 transmits light emitted from the light sources 220, and at the same time diffuses the light emitted from the light sources 220, thereby uniformly providing the light emitted from the light sources 220 to the display panel 100.

The reflection layer 240 may be positioned between the substrate part 210 and the resin layer 230, more particularly on the upper surface of the substrate part 210. The reflection layer 240 may reflect light emitted from the light sources 220.

The reflection layer 240 may again reflect light totally reflected from a boundary between the resin layer 230 and the reflection layer 240, thereby more widely diffusing the light emitted from the light sources 220.

The reflection layer 240 may select a sheet in which a white pigment, for example, titanium dioxide is dispersed, a sheet in which a metal deposition layer is stacked on the surface of the sheet, a sheet in which bubbles are dispersed so as to scatter light, etc. among various types of sheets formed of synthetic resin material. Silver (Ag) may be coated on the surface of the reflection layer 240 so as to increase a reflectance. The reflection layer 240 may be formed by coating a resin on the upper surface of the substrate part 210.

The resin layer 230 may be formed of various kinds of resins capable of transmitting light. For example, the resin layer 230 may contain one or at least two selected from the group consisting of polyethylene terephthalate (PET), polycarbonate (PC), polypropylene, polyethylene, polystyrene, polyepoxy, silicon, acryl, etc.

Further, a refractive index of the resin layer 230 may be approximately 1.4 to 1.6, so that the backlight unit 10B has a uniform luminance by diffusing light emitted from the light sources 220.

The resin layer 230 may contain a polymer resin having an adhesion so as to tightly and closely adhere to the light sources 220 and the reflection layer 240. For example, the resin layer 230 may contain an acrylic resin such as unsaturated polyester, methyl methacrylate, ethyl methacrylate, isobutyl methacrylate, normal butyl methacrylate, normal butylmethylmethacrylate, acrylic acid, methacrylic acid, hydroxy ethylmethacrylate, hydroxy propylmethacrylate, hydroxy ethylacrylate, acrylamide, methylol acrylamide, glycidyl methacrylate, ethylacrylate, isobutylacrylate, normal butylacrylate, 2-ethylhexyl acrylate polymer, copolymer, or terpolymer, etc., an urethane resin, an epoxy resin, a melamine resin, etc.

The resin layer 230 may be formed by coating and curing a liquid or gel-type resin on the upper surface of the substrate part 210 on which the light sources 220 and the reflection layer 240 are formed. Alternatively, the resin layer 230 may be separately manufactured and then may be attached to the upper surface of the substrate part 210.

As a thickness T of the resin layer 230 increases, light emitted from the light sources 220 may be more widely diffused. Hence, the backlight unit 10B may provide light having the uniform luminance to the display panel 100. On the other hand, as the thickness T of the resin layer 230 increases, an amount of light absorbed in the resin layer 230 may increase. Hence, the luminance of light which the backlight unit 10B provides to the display panel 100 may entirely decrease.

Accordingly, the thickness T of the resin layer 230 may be approximately 0.1 mm to 4.5 mm, so that the backlight unit 10B can provide light having the uniform luminance to the display panel 100 without an excessive reduction in the luminance of light.

Figure 4:
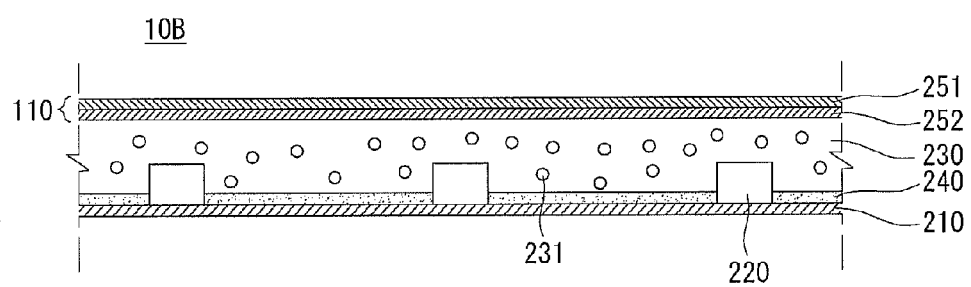

FIG. 4 is a cross-sectional view showing another configuration of the light source part of the backlight unit according to the embodiment of the invention. In the following description, the descriptions of the configuration and the structure described above are omitted.

As shown in FIG. 4, the plurality of light sources 220 may be disposed on the substrate part 210, and the resin layer 230 may be disposed on the upper surface of the substrate part 210. The resin layer 230 may include a plurality of scattering particles 231. The scattering particles 231 may scatter or refract light incident on the resin layer 230, thereby more widely diffusing light emitted from the light sources 220.

The scattering particles 231 may be formed of a material having a refractive index different from a formation material of the resin layer 230 so as to scatter or refract the light emitted from the light source 220. More particularly, the scattering particles 231 may be formed of a material having a refractive index greater than silicon-based resin or acrylic resin forming the resin layer 230. For example, the scattering particles 231 may be formed of polymethylmethacrylate (PMMA)/styrene copolymer (MS), polymethylmethacrylate (PMMA), polystyrene (PS), silicon, titanium dioxide ($TiO_2$), silicon dioxide ($SiO_2$), or a combination thereof.

Alternatively, the scattering particles 231 may be formed of a material having a refractive index less than the formation material of the resin layer 230. For example, the scattering particles 231 may be formed by generating bubbles in the resin layer 230.

Other materials may be used for the scattering particles 231. For example, the scattering particle 231 may be formed using various polymer materials or inorganic particles.

In the embodiment of the invention, the resin layer 230 may be formed by mixing the liquid or gel-type resin with the scattering particles 231 and then coating and curing a mixture on the upper surface of the substrate part 210 on which the light sources 220 and the reflection layer 240 are formed.

Further, an optical sheet 110 may be disposed on the resin layer 230. For example, the optical sheet 110 may include a prism sheet 251 and a diffusion sheet 252. In this instance, a plurality of sheets constituting the optical sheet 110 are not separated from one another and are attached to one another. Thus, a thickness of the optical sheet 110 or a thickness of the backlight unit 10B may be reduced.

The optical sheet 110 may closely adhere to the resin layer 230.

The diffusion sheet 252 may diffuse incident light to thereby prevent light coming from the resin layer 230 from being partially concentrated. Hence, the diffusion sheet 252 may further uniformize the luminance of light. Further, the prism sheet 251 may focus light coming from the diffusion sheet 252, thereby allowing the light to be vertically incident on the display panel 100.

In the embodiment of the invention, at least one of the prism sheet 251 and the diffusion sheet 252 may be removed in the optical sheet 110. The optical sheet 110 may further include other functional layers in addition to the prism sheet 251 and the diffusion sheet 252.

In a direct light emitting manner of the backlight unit, a LED package constituting the light sources 220 may be classified into a top view type LED package and a side view type LED package based on a direction where a light emitting surface of the LED package faces.

Figure 5:
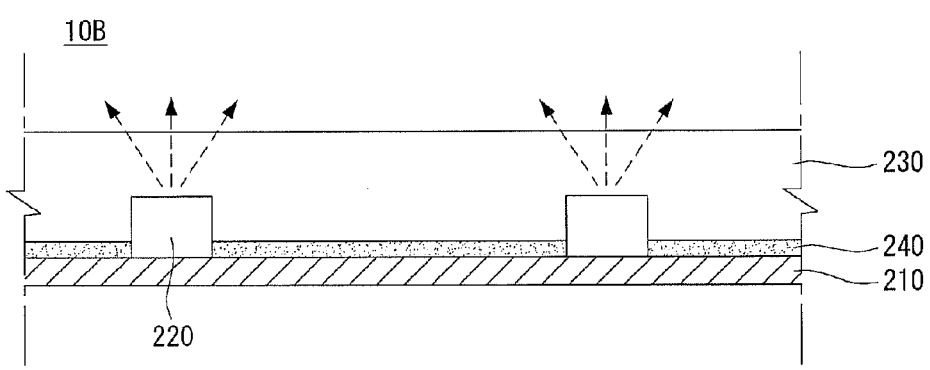

FIG. 5 illustrates a top view type LED package in the direct light emitting manner of the backlight unit.

As shown in FIG. 5, each of the plurality of light sources 220 of the backlight unit 10B has a light emitting surface on an upper surface of each light source 220. Thus, the plurality of light sources 220 may emit light in an upward direction, for example, in a direction perpendicular to the substrate part 210 or the reflection layer 240.

Figure 6:
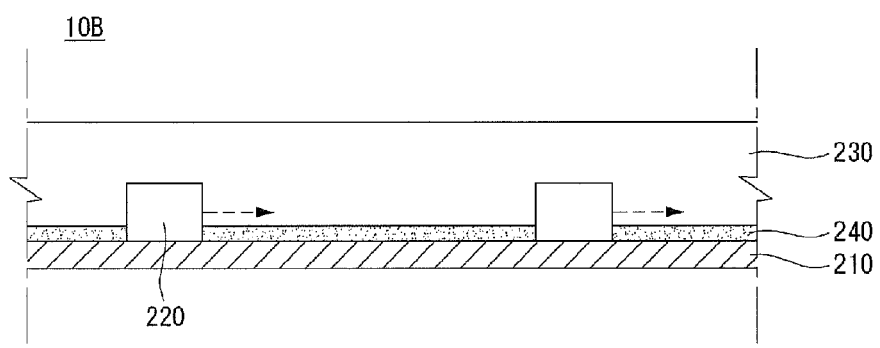

FIG. 6 illustrates a side view type LED package in the direct light emitting manner of the backlight unit.

As shown in FIG. 6, each of the plurality of light sources 220 of the backlight unit 10B has the light emitting surface at the side of each light source 220. Thus, the plurality of light sources 220 may emit light in a lateral direction, for example, a direction parallel to the substrate part 210 or the reflection layer 240. For example, the plurality of light sources 220 may be configured using the side view type LED package. As a result, it is possible to reduce the problem where the light sources 220 are observed as a hot spot on the screen of the display panel 100. Furthermore, the thin profile of the display device may be achieved because of a reduction of the thickness T of the resin layer 230.

Figure 7:
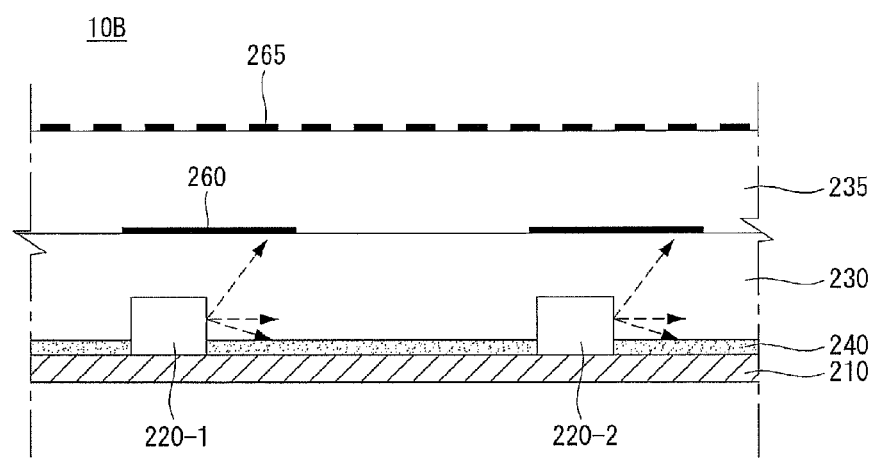

As shown in FIG. 7, the backlight unit 10B may include a plurality of resin layers 230 and 235.

Light emitted from the side of a first light source 220-1 may be transmitted by the first resin layer 230 and may travel to a formation area of a second light source 220-2 adjacent to the first light source 220-1.

A portion of light transmitted by the first resin layer 230 may be emitted in an upward direction corresponding to a direction of the display panel 100. For this, the first resin layer 230 may include a plurality of scattering particles 231 as described above with reference to FIG. 4 and may scatter or refract a direction of the travelling light in the upward direction.

A portion of light emitted from the light source 220 may be incident on the reflection layer 240, and the light incident on the reflection layer 240 may be reflected and diffused in the upward direction.

A large amount of light may be emitted in an area around the light source 220 because of a strong scattering phenomenon around the light source 220 or light emitted from the light source 220 in a direction similar to the upward direction. Hence, light having a high luminance may be observed on the screen of the display panel 100. To prevent this, as shown in FIG. 7, a first light shielding pattern 260 may be formed on the first resin layer 230 to reduce a luminance of light emitted in the area around the light source 220. Hence, the backlight unit 10B may emit light having the uniform luminance. For example, the first light shielding pattern 260 may be formed on the first resin layer 230 corresponding to the formation area of the plurality of light sources 220 to shield a portion of light from the light source 220 and to transmit a portion of the remaining light. Hence, the first light shielding pattern 260 may reduce the luminance of light emitted upward.

The first light shielding pattern 260 may be formed of titanium dioxide ($TiO_2$). In this instance, the first light shielding pattern 260 may reflect a portion of light from the light source 220 in the downward direction and may transmit a portion of the remaining light.

In the embodiment of the invention, the second resin layer 235 may be disposed on the first resin layer 230. The second resin layer 235 may be formed of the same material as or a material different from the first resin layer 230. The second resin layer 235 may diffuse light emitted from the first resin layer 230 in the upward direction, thereby improving the uniformity of the luminance of light from the backlight unit 10B.

The second resin layer 235 may be formed of a material having a refractive index equal to or different from a refractive index of the formation material of the first resin layer 230.

For example, when the second resin layer 235 is formed of the material having the refractive index greater than the refractive index of the first resin layer 230, the second resin layer 235 may widely diffuse light from the first resin layer 230.

On the contrary, when the second resin layer 235 is formed of the material having the refractive index less than the refractive index of the first resin layer 230, light from the first resin layer 230 may increase a reflectance of light reflected from a lower surface of the second resin layer 235. Hence, light from the light source 220 may easily travel along the first resin layer 230.

Each of the first resin layer 230 and the second resin layer 235 may include a plurality of scattering particles. In this instance, a density of the scattering particles of the second resin layer 235 may be greater than a density of the scattering particles of the first resin layer 230. When the second resin layer 235 includes the scattering particles having the density greater than the first resin layer 230, the second resin layer 235 may widely diffuse light upward emitted from the first resin layer 230. Hence, the uniformity of the luminance of light from the backlight unit 108 may be improved.

As shown in FIG. 7, a second light shielding pattern 265 may be formed on the second resin layer 235 to uniformize the luminance of light from the second resin layer 235. For example, when light upward emitted from the second resin layer 235 is concentrated in a specific portion and thus is observed on the screen as the light having the high luminance, the second light shielding pattern 265 may be formed in an area corresponding to a specific portion of an upper surface of the second resin layer 235. Hence, because the second light shielding pattern 265 may reduce the luminance of light in the specific portion, the luminance of light emitted from the backlight unit 10B may be uniform.

The second light shielding pattern 265 may be formed of titanium dioxide ($TiO_2$). In this instance, the second light shielding pattern 265 may reflect downward a portion of light from the second resin layer 235 and may transmit a portion of the remaining light.

Figure 8:
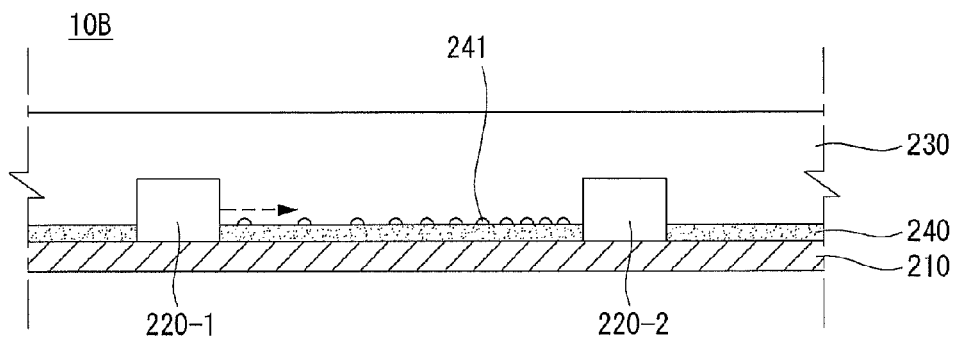

As shown in FIG. 8, a pattern may be formed on the reflection layer 240, thereby facilitating a travel of light emitted from the first light source 220-1 to the second light source 220-2 adjacent to the first light source 220-1.

The pattern on an upper surface of the reflection layer 240 may include a plurality of protrusions 241. Light, which is emitted from the light source 220 and then is incident on the plurality of protrusions 241, may be scattered or refracted in a direction indicated by an arrow of FIG. 8.

As shown in FIG. 8, a density of the protrusions 241 formed on the reflection layer 240 may increase as a separated distance between the protrusions 241 and the light source 220 increases. Hence, a reduction in a luminance of upward emitted light in an area near to an area distant from the light source 220 may be prevented. As a result, the luminance of light provided by the backlight unit 10B may be uniformly maintained.

The protrusions 241 may be formed of the same material as the reflection layer 240. In this instance, the protrusions 241 may be formed by processing the upper surface of the reflection layer 240.

Alternatively, the protrusions 241 may be formed of a material different from the reflection layer 240. In this instance, the protrusions 241 may be formed by printing the pattern on the upper surface of the reflection layer 240.

The shape of the protrusions 241 is not limited to a shape shown in FIG. 8 and may be variously changed. For example, other shapes such as a prism shape may be used.

FIGS. 9 to 30 illustrate a structure and an operation of the backlight unit according to the embodiment of the invention. In the following description, the descriptions of the configuration and the structure described above are omitted.

Figure 9:
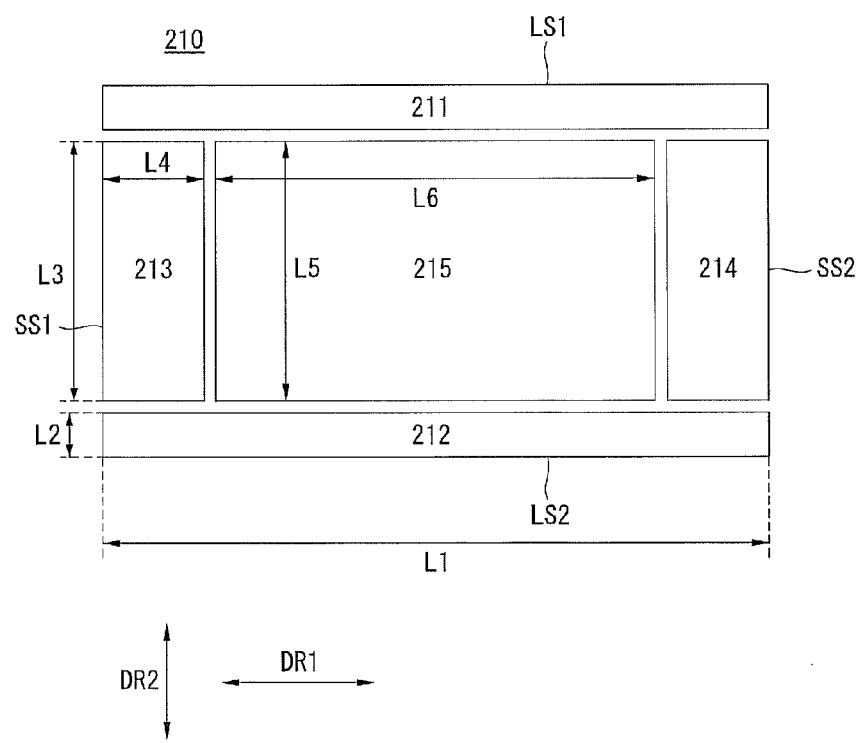
FIGS. 9 to 30 illustrate a structure and an operation of a backlight unit according to an example embodiment of the invention.

As shown in FIG. 9, the substrate part 210 may include a plurality of substrates 211 to 215. At least one light source may be positioned on each of the substrates 211 to 215.

The size of at least one of the substrates 211 to 215 may be different from the size of at least one of the remaining substrates. Preferably, a transverse width and a longitudinal width of at least one of the substrates 211 to 215 may be different from a transverse width and a longitudinal width of at least one of the remaining substrates, respectively.

For example, the first substrate 211 may be positioned on a first long side LS1 of the substrate part 210; the second substrate 212 may be positioned on a second long side LS2 opposite the first long side LS1; the third substrate 213 may be positioned on a first short side SS1 adjacent to the first and second long sides LS1 and LS2; the fourth substrate 214 may be positioned on a second short side SS2 opposite the first short side SS1; and the fifth substrate 215 may be positioned between the first substrate 211 and the second substrate 212 and between the third substrate 213 and the fourth substrate 214.

A width L1 of the first and second substrates 211 and 212 in a first direction (or a horizontal direction) DR1 may be different from widths L4 and L6 of the third, fourth, and fifth substrates 213, 214, and 215 in the first direction DR1. Further, a width L2 of the first and second substrates 211 and 212 in a second direction (or a vertical direction) DR2 different from the first direction DR1 may be different from widths L3 and L5 of the third, fourth, and fifth substrates 213, 214, and 215 in the second direction DR2.

The width L4 of the third and fourth substrates 213 and 214 in the first direction DR1 may be different from the width L6 of the fifth substrate 215 in the first direction DR1.

The substrate, which has a maximum width in the second direction DR2 among the plurality of substrates 211 to 215 of the substrate part 210, may be positioned on the first and second short sides SS1 and SS2 of the substrate part 210. More specifically, the third substrate 213 may be positioned on the first short side SS1 of the substrate part 210, and the fourth substrate 214 may be positioned on the second short side SS2 of the substrate part 210.

Further, the substrate, which has a maximum width in the first direction DR1 among the plurality of substrates 211 to 215 of the substrate part 210, may be positioned on the first and second long sides LS1 and LS2 of the substrate part 210. More specifically, the first substrate 211 may be positioned on the first long side LS1 of the substrate part 210, and the second substrate 212 may be positioned on the second long side LS2 of the substrate part 210.

At least one light source 220 may be disposed on each of the plurality of substrates 211 to 215 of the substrate part 210. The plurality of substrates 211 to 215 may be individually driven.

Figure 10:
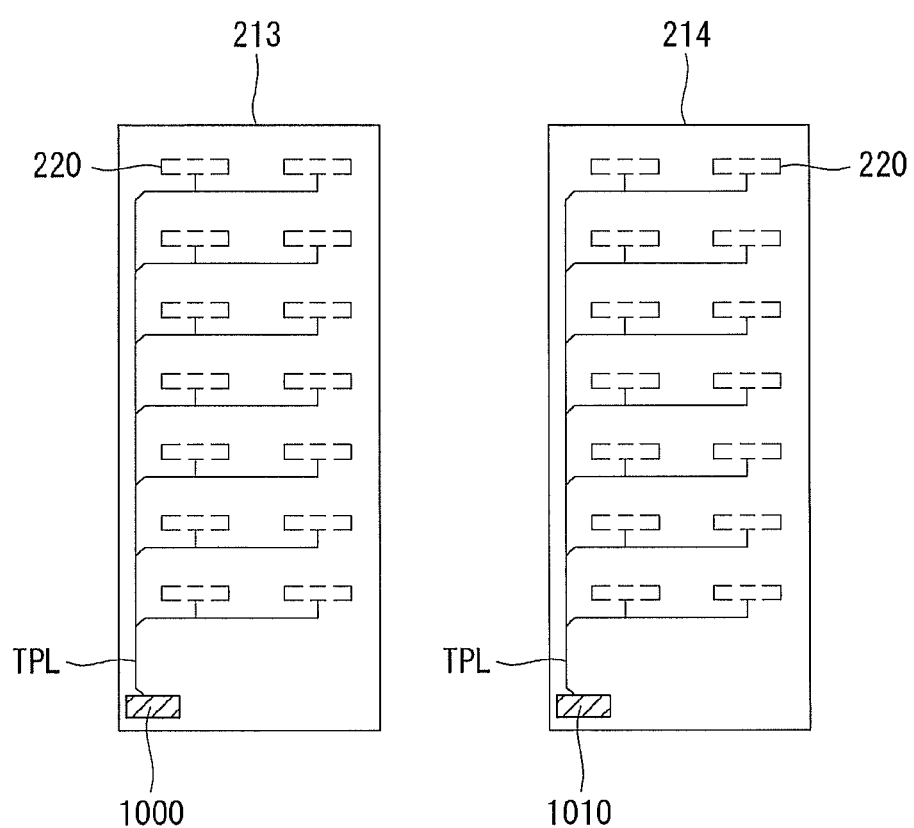

For example, as shown in FIG. 10, the plurality of light sources 220 and a transmission line TPL may be disposed on each of the third and fourth substrates 213 and 214. The transmission line TPL may be electrically connected to the light sources 220 on each of the third and fourth substrates 213 and 214. The transmission line TPL may be patterned on the third and fourth substrates 213 and 214.

Electrode terminals 1000 and 1010 electrically connected to the transmission line TPL may be disposed on the third and fourth substrates 213 and 214, respectively.

Although not shown, connectors electrically connected to the transmission line TPL may be disposed on the third and fourth substrates 213 and 214, respectively.

A driver (not shown) may supply a driving signal to the light sources 220 through the transmission line TPL of each of the third and fourth substrates 213 and 214, thereby turning on the light sources 220.

The driver may individually drive the light sources 220 of the third substrate 213 and the light sources 220 of the fourth substrate 214. For example, the driver may supply the driving signal to the third substrate 213 to turn on the light sources 220 of the third substrate 213. At this time, the driver may not supply the driving signal to the fourth substrate 214 to turn off the light sources 220 of the fourth substrate 214.

Figure 11:
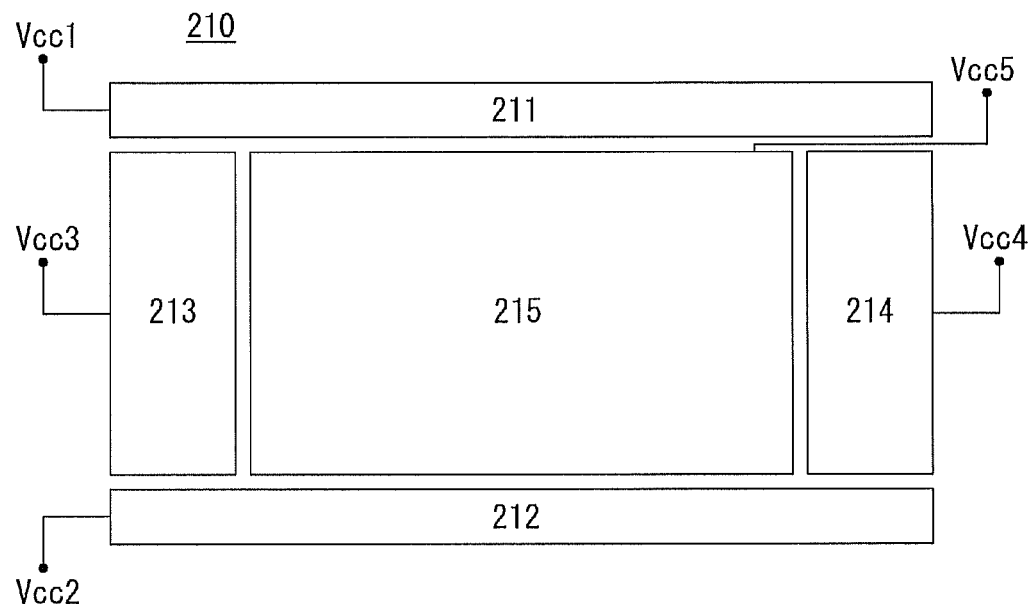

Electric power may be supplied to the substrates 211 to 215 of the substrate part 210 through different paths. For example, as shown in FIG. 11, a first electric power Vcc1 may be supplied to the first substrate 211; a second electric power Vcc2 may be supplied to the second substrate 212; a third electric power Vcc3 may be supplied to the third substrate 213; a fourth electric power Vcc4 may be supplied to the fourth substrate 214; and a fifth electric power Vcc5 may be supplied to the fifth substrate 215.

In this instance, the first to fifth substrates 211 to 215 may be individually driven.

Figure 12:
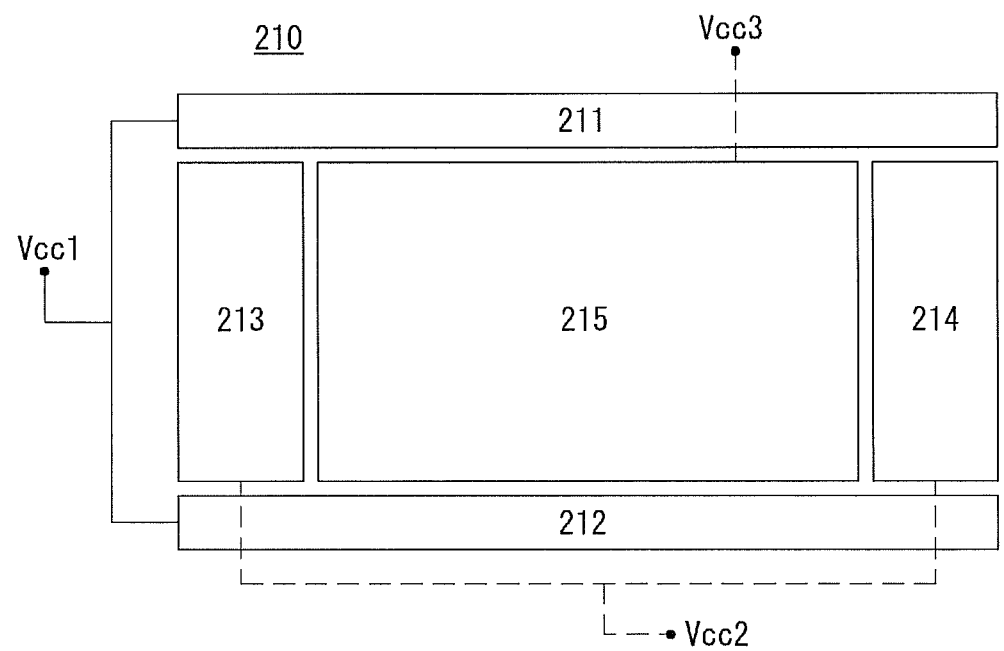

Alternatively, the electric power may be supplied to at least two substrates through the same path. For example, as shown in FIG. 12, the first electric power Vcc1 may be supplied to the first and second substrates 211 and 212, the second electric power Vcc2 may be supplied to the third and fourth substrates 213 and 214, and the third electric power Vcc3 may be supplied to the fifth substrate 215.

In this instance, the first and second substrates 211 and 212 may be synchronized and driven, and the third and fourth substrates 213 and 214 may be synchronized and driven. In other words, the electric power may be supplied to the first and second substrates 211 and 212 through the same node.

The number of light sources disposed on at least one of the plurality of substrates may be different from the number of light sources disposed on at least one of the remaining substrates.

The light sources 220 may be arranged on a predetermined substrate of the plurality of substrates in A×B matrix form, where A and B are a natural number. The light sources 220 may be arranged on at least one of the remaining substrates in C×D matrix form, where C is a natural number different from 'A' and D is a natural number different from 'B'.

Figure 13:
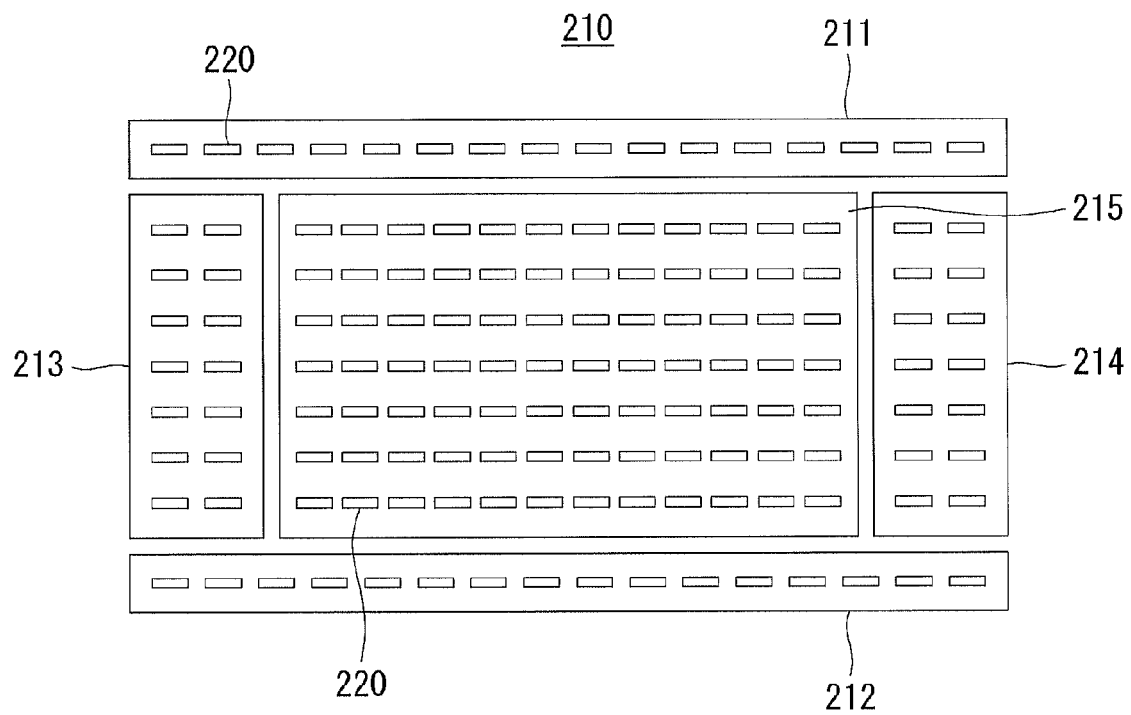

For example, as shown in FIG. 13, the 16 light sources 220 may be arranged on each of the first and second substrates 211 and 212 in 1×16 matrix form. Further, the 14 light sources 220 may be arranged on each of the third and fourth substrates 213 and 214 in 2×7 matrix form, and the 84 light sources 220 may be arranged on the fifth substrate 215 in 12×7 matrix form.

As above, the number of light sources arranged on the fifth substrate 215 may be more than the number of light sources arranged on each of the first to fourth substrates 211 to 214.

The first to fifth substrates 211 to 215 of the substrate part 210 may be suitably disposed on the screen having a ratio of 16:9. In other words, as shown in (A) of FIG. 14, a ratio of a transverse width to a longitudinal width of the substrate part 210 may be about 16:9.

Figure 14:
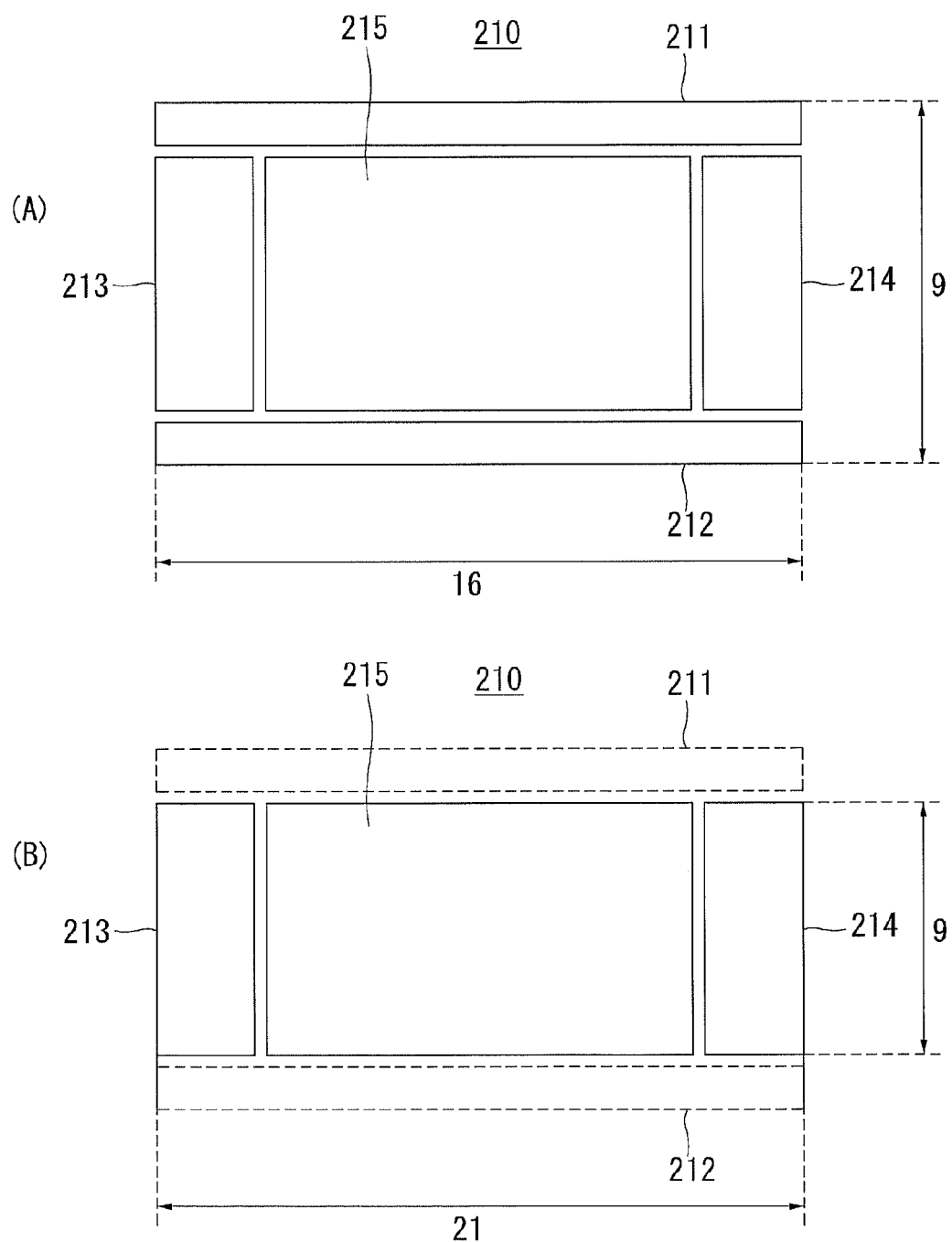

Alternatively, as shown in (B) of FIG. 14, when the first and second substrates 211 and 212 are removed in the substrate part 210, a ratio of a transverse width to a longitudinal width of the substrate part 210 may be about 21:9.

Figure 15:
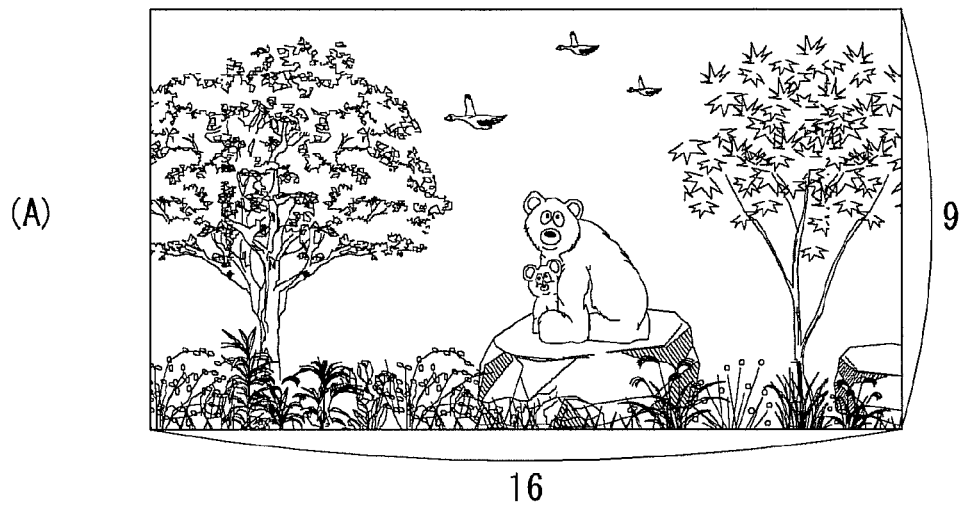
Figure 15:
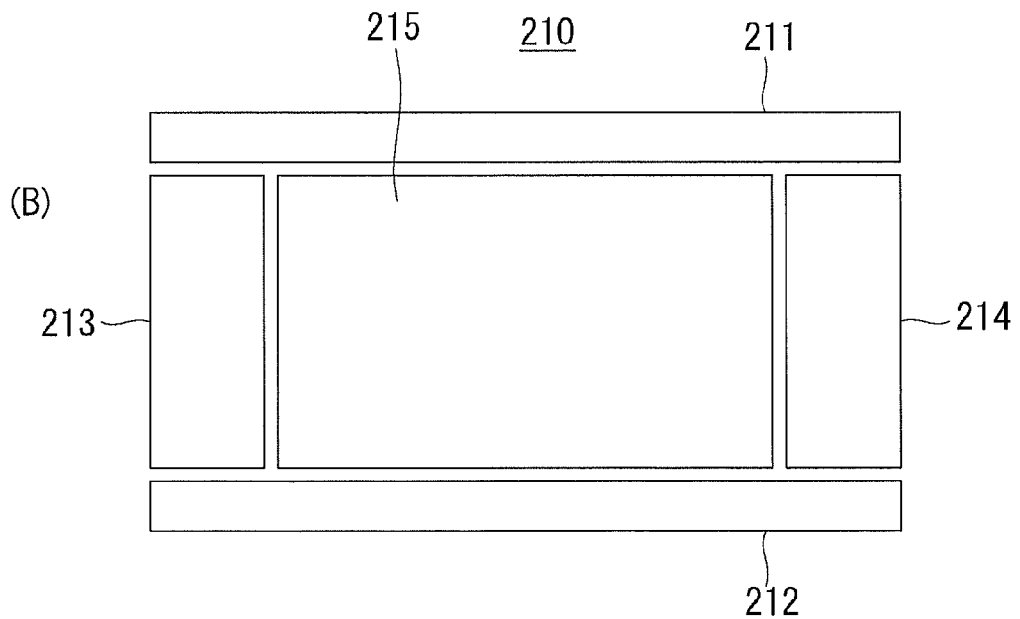

Hence, when video data having a screen ratio of 16:9 is supplied to the display panel as shown in (A) of FIG. 15, the electric power may be supplied to the first to fifth substrates 211 to 215 as shown in (B) of FIG. 15.

Figure 16:
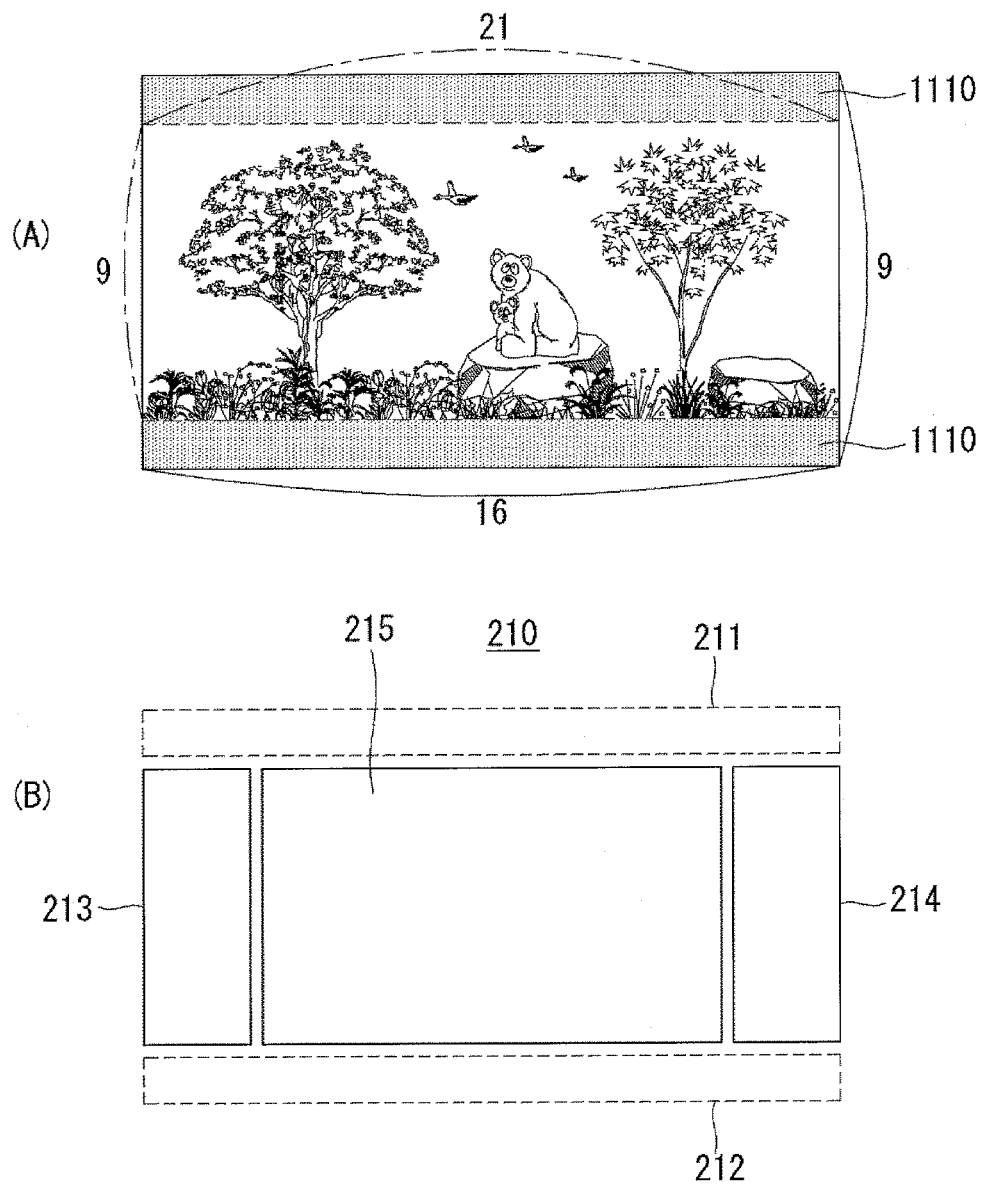

Further, when video data having a screen ratio of 21:9 is supplied to the display panel as shown in (A) of FIG. 16, the first and second substrates 211 and 212 may be turned off as shown in (B) of FIG. 16.

As described above, when an image is displayed on the substrate part 210 including the first to fifth substrates 211 to 215 in the ratio of 21:9, a luminance of a non-display area 1110 of the image of 21:9 may be reduced. Hence, a light leakage phenomenon in the non-display area 1110 of the image of 21:9 may be prevented. Further, even if a local dimming drive is implemented using all the five substrates 211 to 215, an excessive increase in the manufacturing cost may be prevented.

Figure 17:
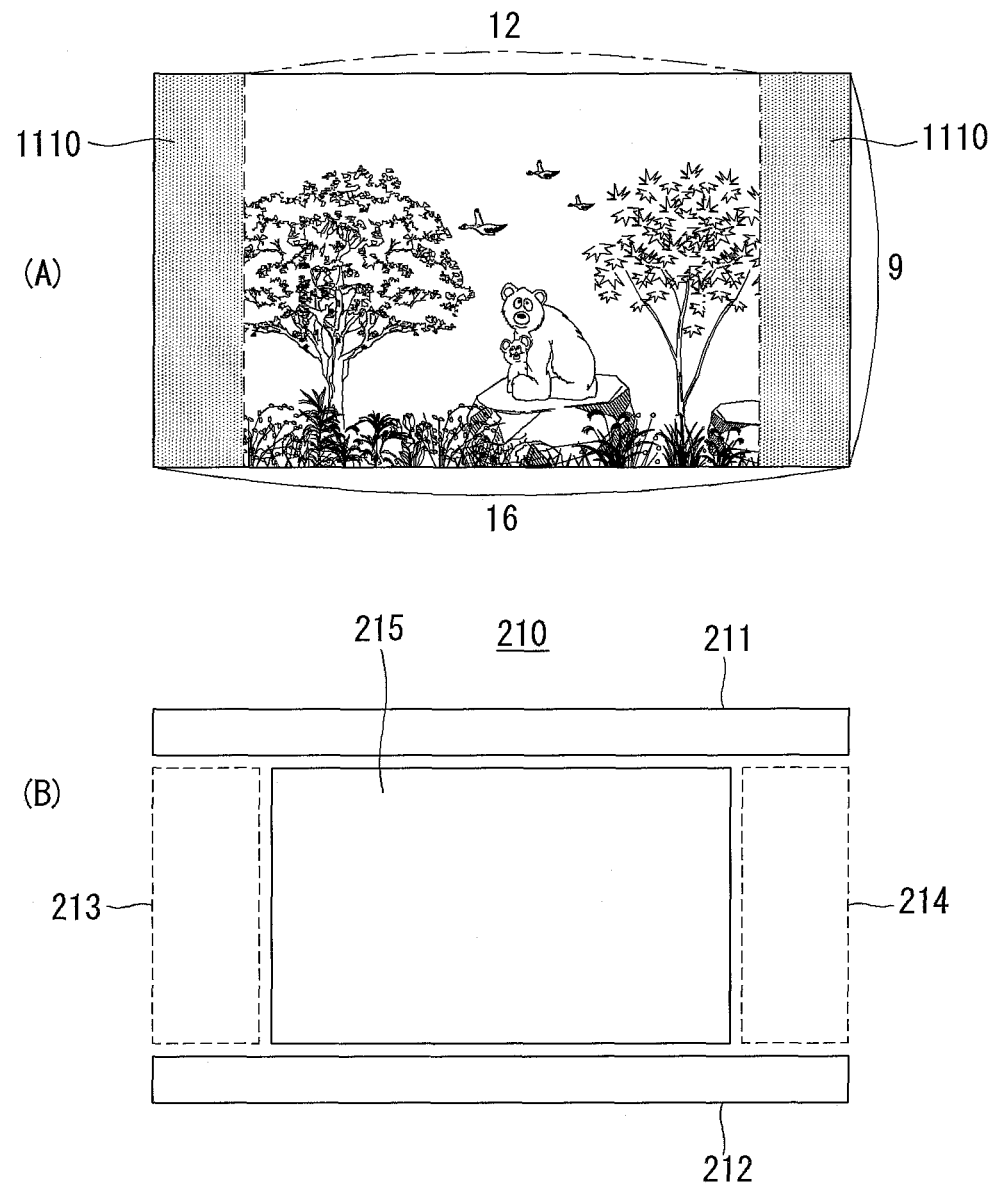

Further, when video data having a screen ratio of 4:3 is supplied to the display panel as shown in (A) of FIG. 17, the third and fourth substrates 213 and 214 may be turned off as shown in (B) of FIG. 17.

As described above, when an image is displayed on the substrate part 210 including the first to fifth substrates 211 to 215 in the ratio of 4:3, a luminance of a non-display area 1110 of the image of 4:3 may be reduced. Hence, the light leakage phenomenon in the non-display area 1110 of the image of 4:3 may be prevented.

As shown in FIG. 17, when the video data having the screen ratio of 4:3 is supplied to the display panel, the driving signal may be supplied to the first and second substrates 211 and 212. Hence, the light sources 220 disposed on the first and second substrates 211 and 212 may be turned on in the non-display area 1110 of the image of 4:3.

Figure 18:
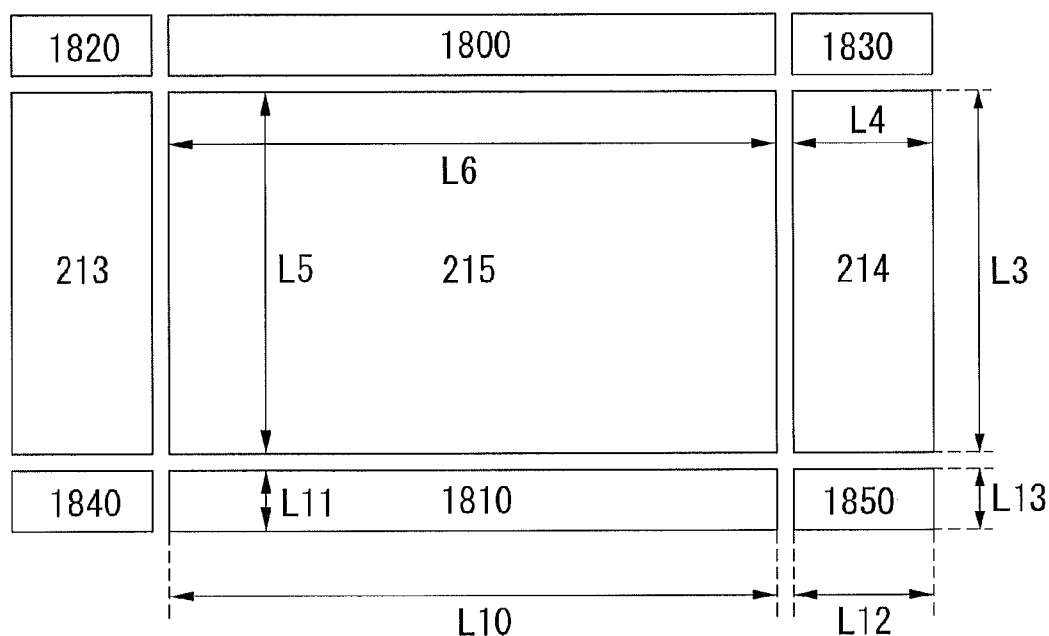
Figure 18:
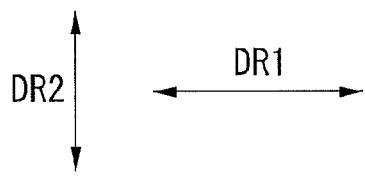
Figure 19:
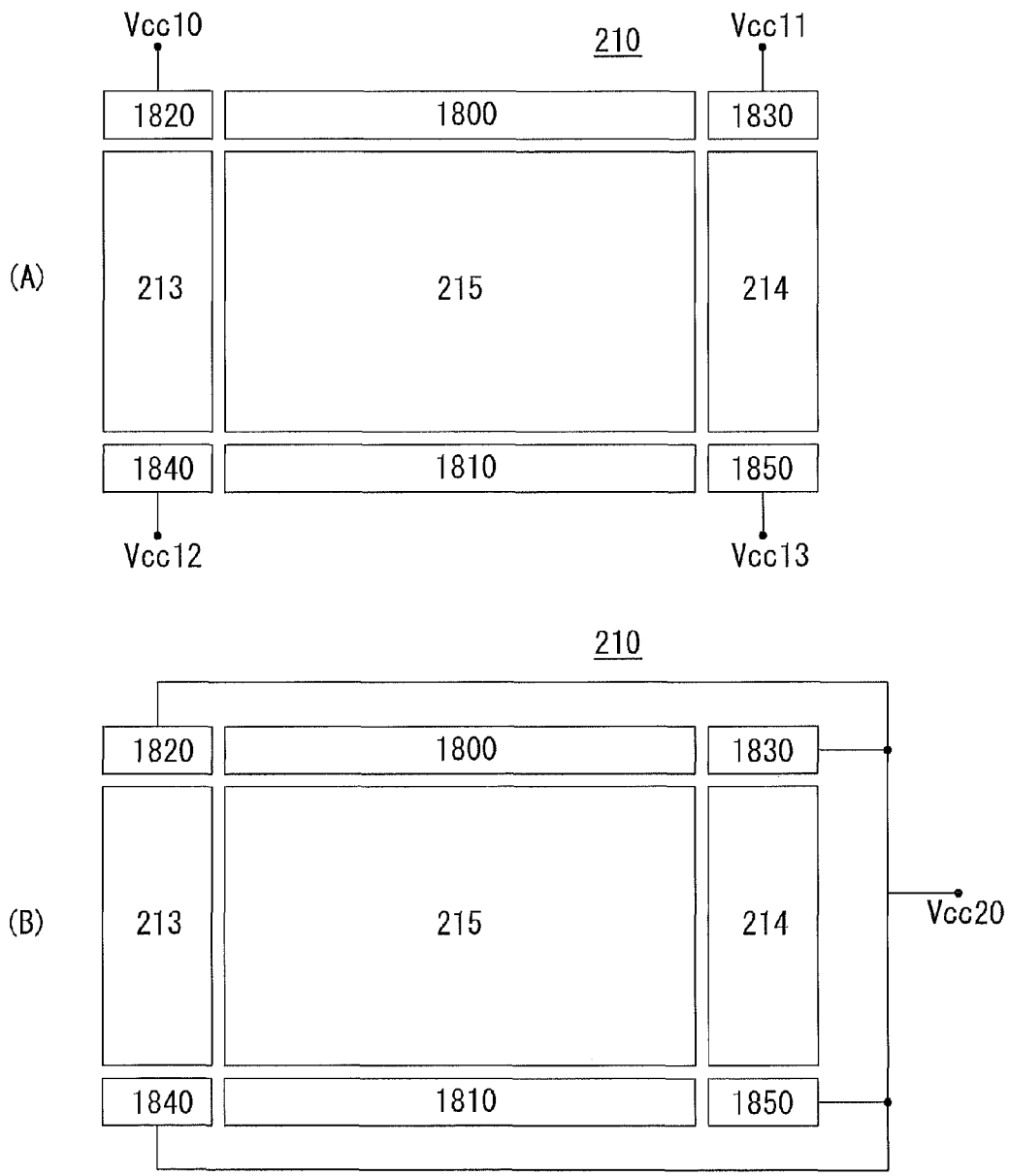

As shown in FIG. 18, if each of the first and second substrates 211 and 212 among the plurality of substrates 211 to 215 may be divided into a plurality of sub-substrates.

For example, the first substrate 211 may be divided into a 1-1 substrate 1800, a 1-2 substrate 1820, and a 1-3 substrate 1830. The second substrate 212 may be divided into a 2-1 substrate 1810, a 2-2 substrate 1840, and a 2-3 substrate 1850.

In this instance, the size of at least one of the plurality of substrates 213 to 215 and 1800 to 1850 may be different from the size of at least one of the remaining substrates.

In other words, the 1-1 substrate 1800 may be positioned on the first long side LS1 of the substrate part 210; the 2-1 substrate 1810 may be positioned on the second long side LS2 of the substrate part 210; the third substrate 213 may be positioned on the first short side SS1 of the substrate part 210; the fourth substrate 214 may be positioned on the second short side SS2 of the substrate part 210; and the fifth substrate 215 may be positioned between the 1-1 substrate 1800 and the 2-1 substrate 1810 and between the third substrate 213 and the fourth substrate 214.

Further, the 1-2 substrate 1820 may be positioned on the corner between the first long side LS1 and the first short side SS1 of the substrate part 210; the 1-3 substrate 1830 may be positioned on the corner between the first long side LS1 and the second short side SS2 of the substrate part 210; the 2-2 substrate 1840 may be positioned on the corner between the second long side LS2 and the first short side SS1 of the substrate part 210; and the 2-3 substrate 1850 may be posi-tioned on the corner between the second long side LS2 and the second short side SS2 of the substrate part 210.

In this instance, a width L10 of the 1-1 and 2-1 substrates 1800 and 1810 in the first direction DR1 may be different from widths L12, L4, and L6 of the 1-2, 1-3, 2-2, 2-3, third, fourth, and fifth substrates 1820, 1830, 1840, 1850, 213, 214, and 215 in the first direction DR1. Further, a width L11 of the 1-1 and 2-1 substrates 1800 and 1810 in the second direction DR2 may be different from widths L3 and L5 of the third, fourth, and fifth substrates 213, 214, and 215 in the second direction DR2.

In this instance, the width L11 of the 1-1 and 2-1 substrates 1800 and 1810 in the second direction DR2 may be substantially the same as a width L13 of the 1-2, 1-3, 2-2, and 2-3 substrates 1820, 1830, 1840, and 1850 in the second direction DR2.

The substrate, which has a maximum width in the second direction DR2 among the plurality of substrates 213 to 215 and 1800 to 1850 of the substrate part 210, may be positioned on the first and second short sides SS1 and SS2 of the substrate part 210. More specifically, the third substrate 213 and the fourth substrate 214 each having the maximum width in the second direction DR2 may be respectively positioned on the first and second short sides SS1 and SS2 of the substrate part 210.

Further, the substrate, which has a maximum width in the first direction DR1 among the plurality of substrates 213 to 215 and 1800 to 1850 of the substrate part 210, may be positioned on the first and second long sides LS1 and LS2 of the substrate part 210. More specifically, the 1-1 substrate 1800 and the 2-1 substrate 1810 each having the maximum width in the first direction DR1 may be respectively positioned on the first and second long sides LS1 and LS2 of the substrate part 210.

Even in the configuration of the substrate part 210, at least one light source 220 may be disposed on each of the plurality of substrates 213 to 215 and 1800 to 1850. The plurality of substrates 213 to 215 and 1800 to 1850 may be individually driven.

Electric power may be supplied to the 1-1, 1-2, 1-3, 2-1, 2-2, and 2-3 substrates 1800 to 1850 of the substrate part 210 through different paths. For example, as shown in (A) of FIG. 19, an electric power Vcc10 may be supplied to the 1-2 substrate 1820; an electric power Vcc11 may be supplied to the 1-3 substrate 1830; an electric power Vcc12 may be supplied to the 2-2 substrate 1840; and an electric power Vcc13 may be supplied to the 2-3 substrate 1850.

Although not shown, it is a matter of course that different electric powers may be supplied to the 1-1 and 2-1 substrates 1800 and 1810.

In this instance, the 1-1, 1-2, 1-3, 2-1, 2-2, and 2-3 substrates 1800 to 1850 may be individually driven.

Alternatively, the electric power may be supplied to at least two substrates through the same path. For example, as shown in (B) of FIG. 19, an electric power Vcc20 may be commonly supplied to the 1-2, 1-3, 2-2, and 2-3 substrates 1820, 1830, 1840, and 1850.

In this instance, the 1-2, 1-3, 2-2, and 2-3 substrates 1820, 1830, 1840, and 1850 may be synchronized and driven. In other words, the electric power may be supplied to the 1-2, 1-3, 2-2, and 2-3 substrates 1820, 1830, 1840, and 1850 through the same node.

Even in this instance, the number of light sources disposed on at least one of the plurality of substrates may be different from the number of light sources disposed on at least one of the remaining substrates.

Figure 20:
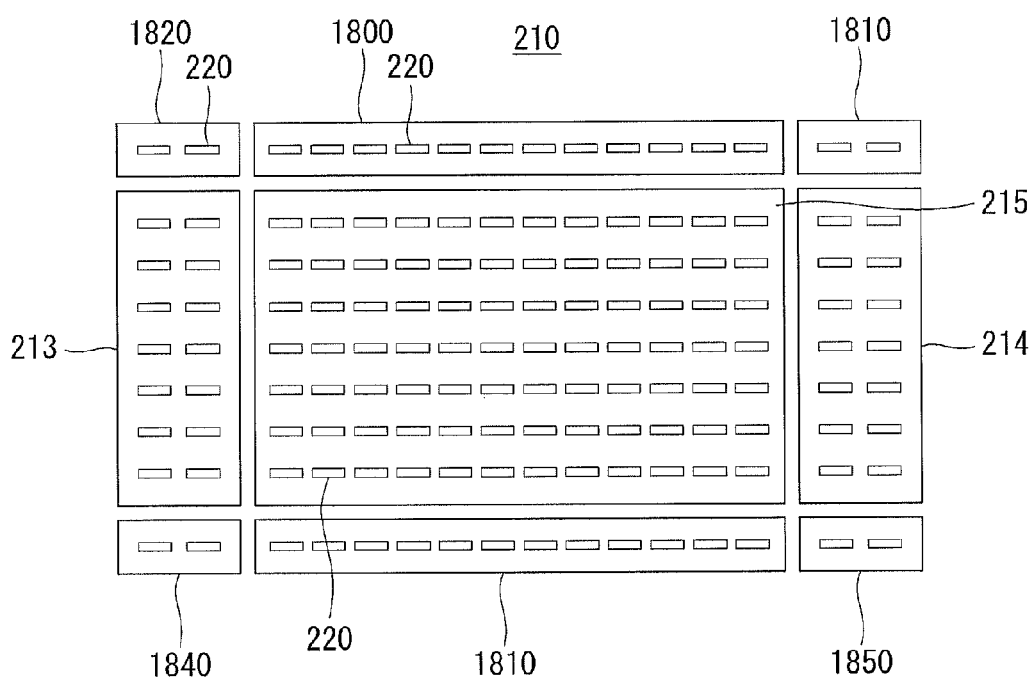

For example, as shown in FIG. 20, the 12 light sources 220 may be arranged on each of the 1-1 and 2-1 substrates 1800 and 1810 in 1×12 matrix form, and the 2 light sources 220 may be arranged on each of the 1-2, 1-3, 2-2, and 2-3 substrates 1820, 1830, 1840, and 1850 in 1×2 matrix form. Further, the 14 light sources 220 may be arranged on each of the third and fourth substrates 213 and 214 in 2×7 matrix form, and the 84 light sources 220 may be arranged on the fifth substrate 215 in 12×7 matrix form.

As described above, the 1-2, 1-3, 2-2, and 2-3 substrates 1820, 1830, 1840, and 1850, on which the minimum number of light sources is arranged among the plurality of substrates 213 to 215 and 1800 to 1850, may be positioned on the corner of the substrate part 210.

The plurality of substrates 213 to 215 and 1800 to 1850 of the substrate part 210 may be suitably disposed on the screen having a ratio of 16:9. In other words, as shown in (A) of FIG. 21, a ratio of a transverse width to a longitudinal width of the substrate part 210 may be about 16:9.

Hence, as described above with reference to (A) of FIG. 15, when video data having a screen ratio of 16:9 is supplied to the display panel, the electric power may be supplied to the plurality of substrates 213 to 215 and 1800 to 1850.

Figure 21:
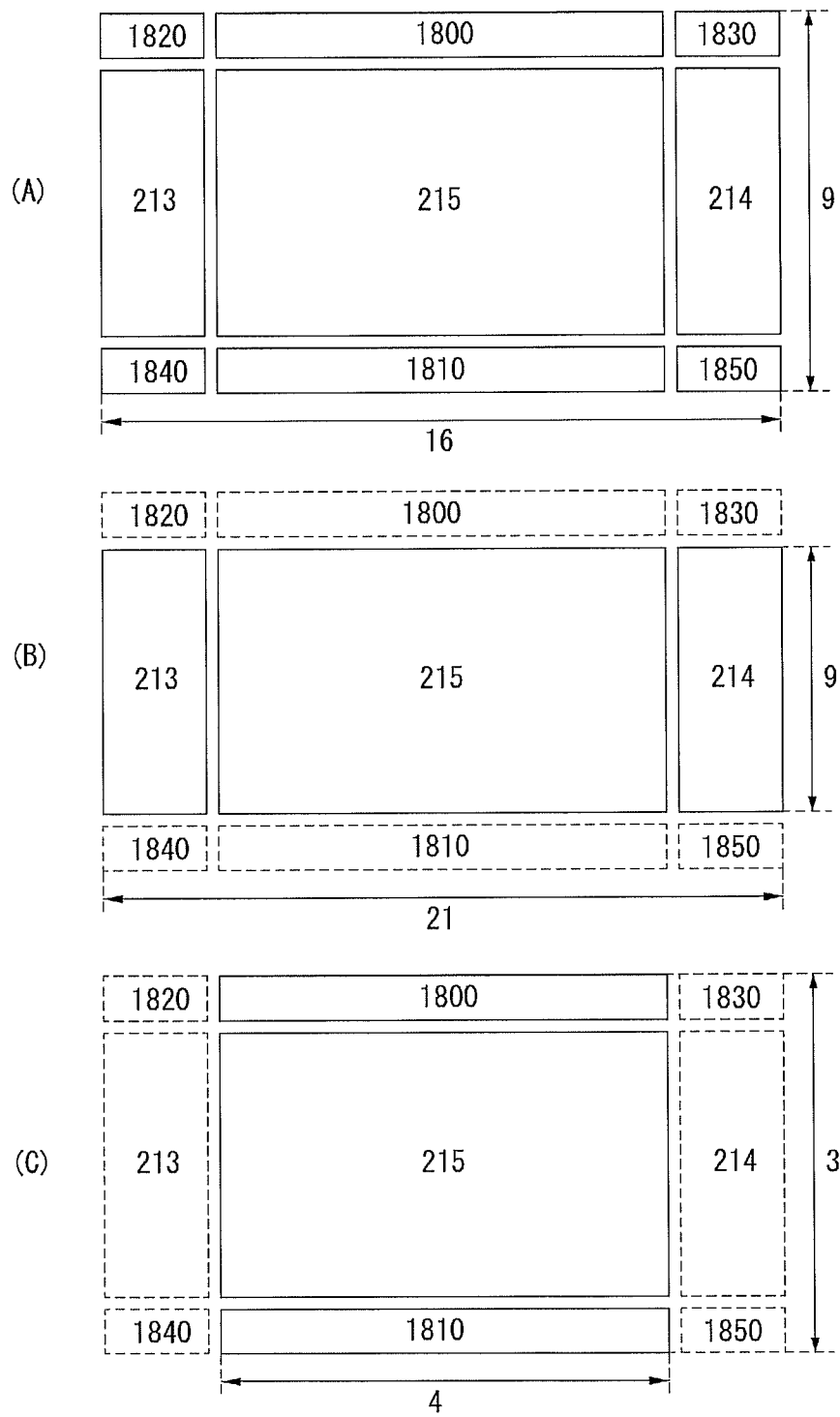

Alternatively, as shown in (B) of FIG. 21, when the 1-1, 1-2, 1-3, 2-1, 2-2, and 2-3 substrates 1800 to 1850 are removed in the substrate part 210, a ratio of a transverse width to a longitudinal width of the substrate part 210 may be about 21:9.

Hence, as described above with reference to (A) of FIG. 16, when video data having a screen ratio of 21:9 is supplied to the display panel, the 1-1, 1-2, 1-3, 2-1, 2-2, and 2-3 substrates 1800 to 1850 may be turned off.

Alternatively, as shown in (C) of FIG. 21, when the 1-2, 1-3, 2-2, 2-3, third, and fourth substrates 1820, 1830, 1840, 1850, 213, and 214 are removed in the substrate part 210, a ratio of a transverse width to a longitudinal width of the substrate part 210 may be about 4:3.

Hence, as described above with reference to (A) of FIG. 17, when video data having a screen ratio of 4:3 is supplied to the display panel, 1-2, 1-3, 2-2, 2-3, third, and fourth substrates 1820, 1830, 1840, 1850, 213, and 214 may be turned off.

Each of the plurality of substrates included in the substrate part 210 may be physically divided.

Figure 22:
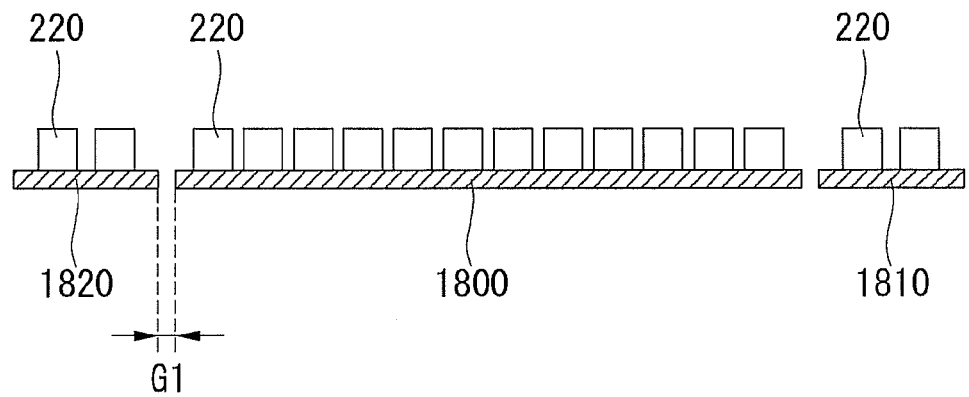

For example, as shown in FIG. 22, the 1-2, 1-1, and 1-3 substrates 1820, 1800, and 1830 may be physically divided. Further, the two adjacent substrates may be separated from each other by a predetermined distance G1.

In this instance, a reflection layer may be commonly formed on at least two substrates.

Figure 23:
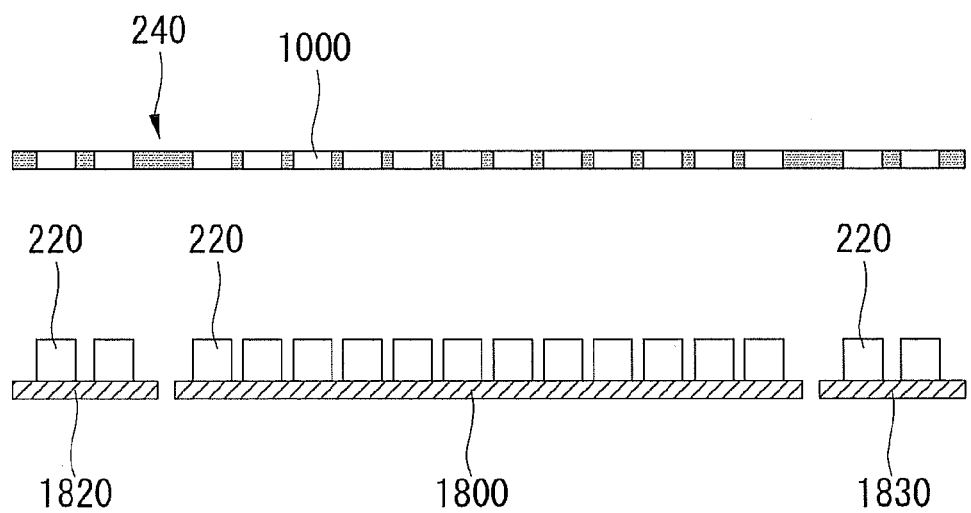

For example, as shown in FIG. 23, a reflection layer 240 may have a plurality of holes 1000. The reflection layer 240 may be formed on the 1-2, 1-1, and 1-3 substrates 1820, 1800, and 1830, so that the light sources 220 are aligned with the holes 1000. The reflection layer 240 may be formed of a material having a high reflectance, for example, silver (Ag). For example, the reflection layer 240 may be a foil formed of silver (Ag).

In this instance, the reflection layer 240 may commonly overlap at least two substrates. For example, one sheet type reflection layer 240 may be disposed on the five or nine substrates.

In this instance, the reflection layer 240 may be easily formed. Because the integral reflection layer 240 is formed on the 1-2, 1-1, and 1-3 substrates 1820, 1800, and 1830, reflection efficiency may be improved. Because planarization of the reflection layer 240 is maintained at a boundary of the adjacent substrates 1820, 1800, and 1830, the reflection efficiency may be further improved.

Although not shown, before the reflection layer 240 is formed on the 1-2, 1-1, and 1-3 substrates 1820, 1800, and 1830, an adhesive layer may be formed on the 1-2, 1-1, and 1-3 substrates 1820, 1800, and 1830. Hence, an adhesive strength between the reflection layer 240 and the 1-2, 1-1, and 1-3 substrates 1820, 1800, and 1830 may be improved, and also an adhesive strength between the substrates 1820, 1800, and 1830 may be improved may be improved.

Figure 24:
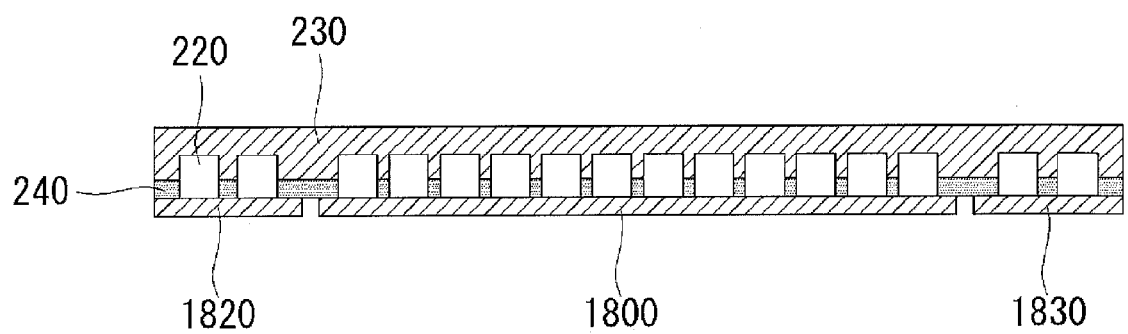

Next, as shown in FIG. 24, a resin layer 230 may be formed on the light sources 220 and the reflection layer 240.

The resin layer 230 may be formed by applying a resin material to the substrates 1820, 1800, and 1830, on which the light sources 220 and the reflection layer 240 are formed, and drying the applied resin material.

Alternatively, the plurality of substrates included in the substrate part 210 may be logically divided.

Figure 25:
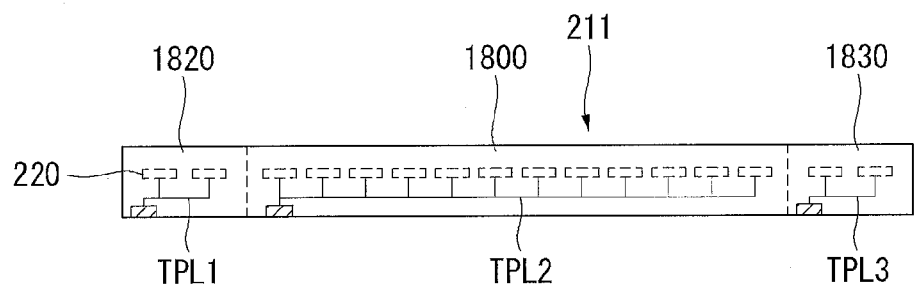

For example, as shown in FIG. 25, the plurality of light source 220 may be disposed on the first substrate 211. The light sources 220 disposed on the 1-1 substrate 1800 of the first substrate 211 may be electrically connected to a second transmission line TPL2, the light sources 220 disposed on the 1-2 substrate 1820 of the first substrate 211 may be electrically connected to a first transmission line TPL1, and the light sources 220 disposed on the 1-3 substrate 1830 of the first substrate 211 may be electrically connected to a fourth transmission line TPL3.

In this instance, the light sources 220 disposed on the 1-1 substrate 1800, the light sources 220 disposed on the 1-2 substrate 1820, and the light sources 220 disposed on the 1-3 substrate 1830 may be individually driven.

As above, the local dimming drive may be implemented using the first substrate 211 as a mother substrate.

The fifth substrate 215 disposed in the middle of the substrate part 210 may be divided into a plurality of sub-sub-strates, on which the light sources are positioned.

Figure 26:
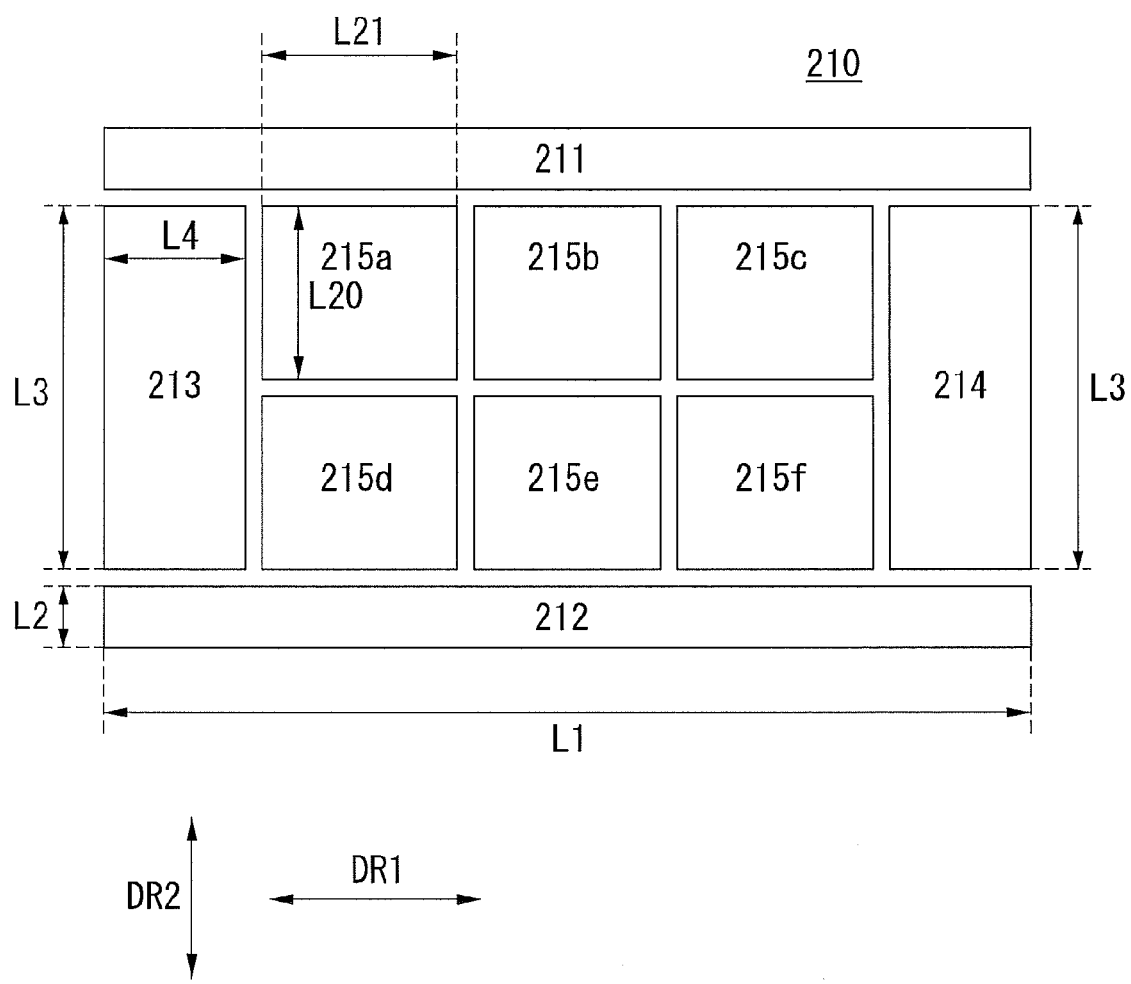

For example, as shown in FIG. 26, the fifth substrate 215 may be divided into first to sixth sub-substrates 215a to 215f.

In this instance, the 16 light sources 220 may be arranged on each of the first and second substrates 211 and 212, and the 14 light sources 220 may be arranged on each of the third and fourth substrates 213 and 214 in the same manner as FIG. 13.

Even in this instance, the size of at least one of the plurality of substrates 211 to 214 and 215a to 215f may be different from the size of at least one of the remaining substrates.

For example, a width L1 of the first and second substrates 211 and 212 in the first direction DR1 may be different from widths L4 and L21 of the third and fourth substrates 213 and 214 and the first to sixth sub-substrates 215a to 215f in the first direction DR1. Further, a width L2 of the first and second substrates 211 and 212 in the second direction DR2 may be different from widths L3 and L20 of the third and fourth substrates 213 and 214 and the first to sixth sub-substrates 215a to 215f in the second direction DR2.

The width L4 of the third and fourth substrates 213 and 214 in the first direction DR1 may be different from the width L21 of the first to sixth sub-substrates 215a to 215f in the first direction DR1. Further, the width L3 of the third and fourth substrates 213 and 214 in the second direction DR2 may be different from the width L20 of the first to sixth sub-substrates 215a to 215f in the second direction DR2. The first to sixth sub-substrates 215a to 215f may have almost the same size.

The fifth substrate 215 may be physically divided into the first to sixth sub-substrates 215a to 215f.

Figure 27:
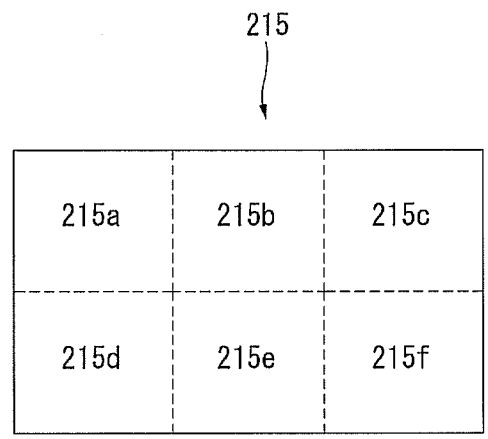

Alternatively, as shown in FIG. 27, the fifth substrate 215 may be logically divided into the first to sixth sub-substrates 215a to 215f.

Even in this instance, the number of light sources disposed on at least one of the plurality of sub-substrates of the fifth substrate 215 may be different from the number of light sources disposed on at least one of the remaining sub-sub-strates.

Figure 28:
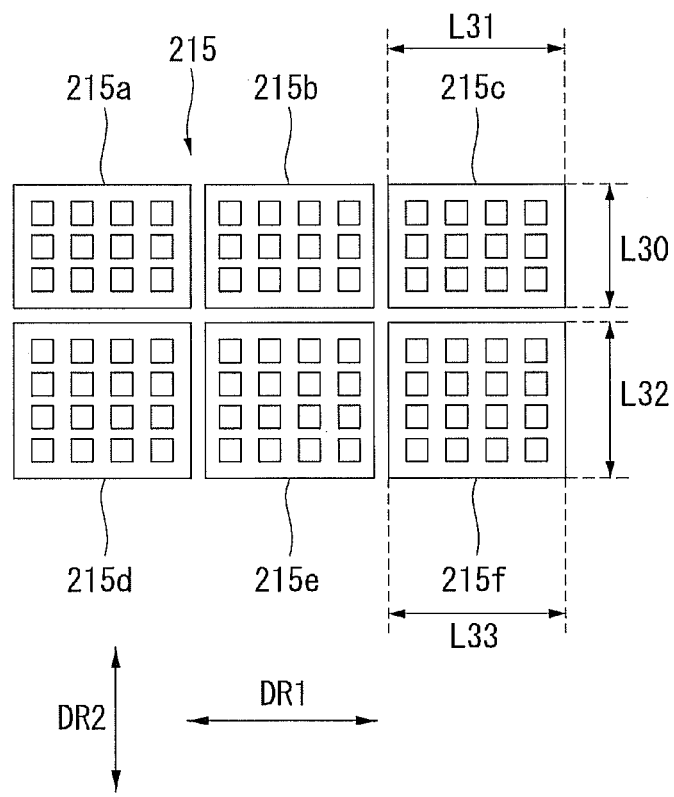

For example, as shown in FIG. 28, the 12 light sources 220 may be arranged on each of the first, second, and third sub-substrates 215a, 215b, and 215c in 4×3 matrix form, and the 16 light sources 220 may be arranged on each of the fourth, fifth, and sixth sub-substrates 215d, 215e, and 215f in 4×4 matrix form.

The size of at least one of the plurality of sub-substrates of the fifth substrate 215 may be different from the size of at least one of the remaining sub-substrates.

For example, a width L30 of the first, second, and third sub-substrates 215a, 215b, and 215c in the second direction DR2 may be different from a width L32 of the fourth, fifth, and sixth sub-substrates 215d, 215e, and 215f in the second direction DR2.

On the other hand, a width L31 of the first, second, and third sub-substrates 215a, 215b, and 215c in the first direction DR1 may be almost the same as a width L33 of the fourth, fifth, and sixth sub-substrates 215d, 215e, and 215f in the first direction DR1.

Further, the number of light sources disposed on each of the fourth, fifth, and sixth sub-substrates 215d, 215e, and 215f may be sixteen and may be the same as the number of light sources disposed on the first and second substrates 211 and 212.

In this instance, the width L33 of the fourth, fifth, and sixth sub-substrates 215d, 215e, and 215f in the first direction DR1 may be different from the width L1 of the first and second substrates 211 and 212 in the first direction DR1. Further, the width L32 of the fourth, fifth, and sixth sub-substrates 215d, 215e, and 215f in the second direction DR2 may be different from the width L2 of the first and second substrates 211 and 212 in the second direction DR2.

The embodiments of the invention, in which at least one substrate is turned off based on the screen ratio of the image, were described above. However, the local dimming drive may be implemented irrespective of the screen ratio of the image in the embodiments of the invention.

For example, as shown in FIG. 28, when the fifth substrate 215 is divided into the first to sixth sub-substrates 215a to 215f, the first to sixth sub-substrates 215a to 215f may be driven in the local dimming manner.

Figure 29:
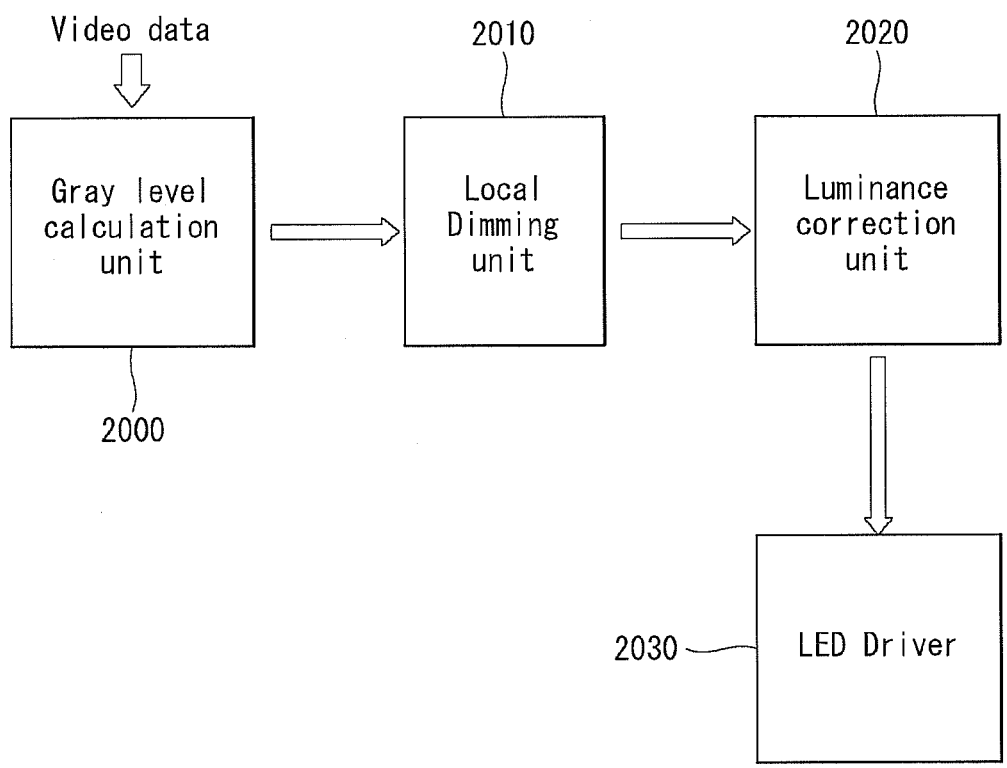

For this, as shown in FIG. 29, the driver of the display device according to the embodiment of the invention may include a gray level calculation unit 2000, a local dimming unit 2010, a luminance correction unit 2020, and a LED driver 2030.

The gray level calculation unit 2000 may calculate a gray level of the video data.

The local dimming unit 2010 may output a control signal for controlling a luminance of the light sources based on the gray level of the video data calculated by the gray level calculation unit 2000.

The luminance correction unit 2020 may output a control signal for correcting the luminance of the light sources in consideration of the output of the local dimming unit 2010.

The LED driver 2030 may supply a driving signal to each of the light sources in consideration of the output of the local dimming unit 2010 and the luminance correction unit 2020.

The luminance correction unit 2020 may decide whether or not the local dimming drive is applied as the output signal of the local dimming unit 2010.

When the local dimming drive is applied as the result of a decision, the gray level calculation unit 2000 may analyze the calculated gray level of the video data and compare a gray level of each screen area with a reference gray level.

The driver of the display device according to the embodiment of the invention may decide whether or not an area having a gray level less than the reference gray level exists as the result of a comparison between the reference gray level and the gray level of each screen area, and may perform a luminance correction of a corresponding area when the area having the gray level less than the reference gray level exists as the result of a decision. Namely, the driver may control the driving signal supplied to the light sources 220 existing in the area having the gray level less than the reference gray level, thereby controlling the luminance of the light sources 220.

Accordingly, in the embodiments of the invention, the local dimming drive may be implemented through the above-described method irrespective of the screen ratio of the image.

Figure 30:
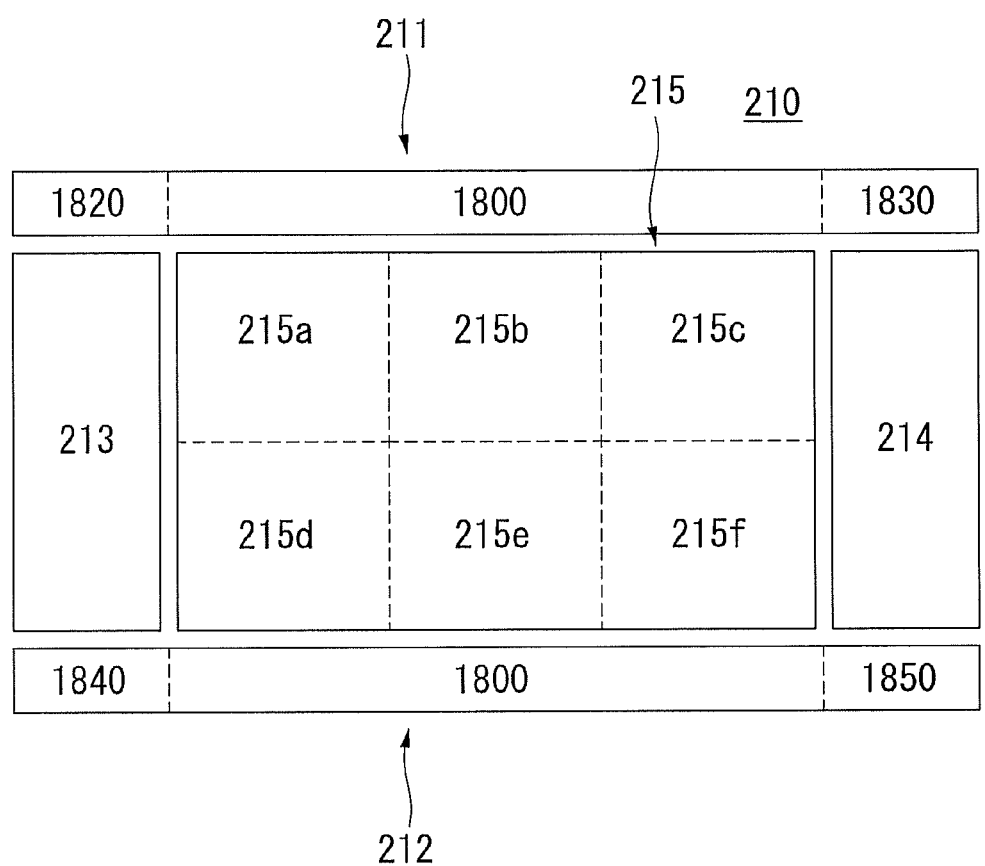

As shown in FIG. 30, the substrate part 210 according to the embodiment of the invention may include the first substrate 211 including the 1-1, 1-2, and 1-3 substrates 1800, 1820, and 1830, the second substrate 212 including the 2-1, 2-2, and 2-3 substrates 1810, 1840, and 1850, the third substrate 213, the fourth substrate 214, and the fifth substrate 215 including the first to sixth sub-substrates 215a to 215f, so as to efficiently implement the local dimming drive irrespective of the screen ratio of the image while turning on or off each substrate based on the screen ratio of the image.

In this instance, the first substrate 211 may be logically divided into the 1-1, 1-2, and 1-3 substrates 1800, 1820, and 1830, and the second substrate 212 may be logically divided into the 2-1, 2-2, and 2-3 substrates 1810, 1840, and 1850. Further, the fifth substrate 215 may be logically divided into the first to sixth sub-substrates 215a to 215f.

FIGS. 31 to 40 illustrate configuration of the display device according to the embodiment of the invention. In the following description, the descriptions of the configuration and the structure described above are omitted.

Figure 31:
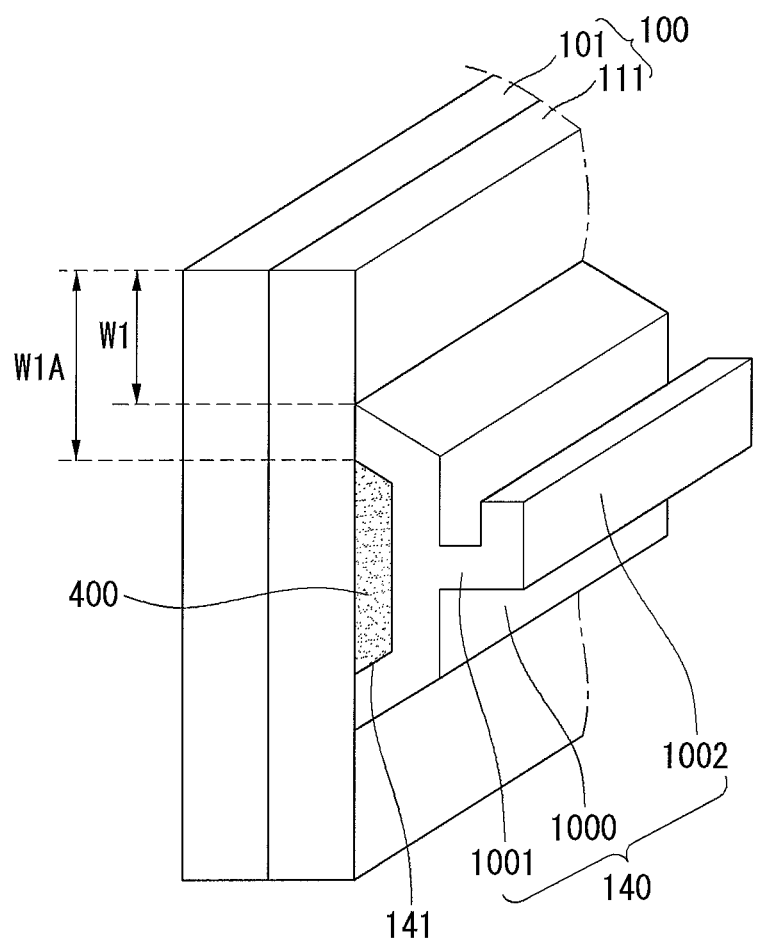
FIGS. 31 to 40 illustrate configuration of a display device according to an example embodiment of the invention.

As shown in FIG. 31, an adhesive layer 400 may be formed between the back surface of the back substrate 111 of the display panel 100 and the bracket 140. The bracket 140 may be attached to the back surface of the back substrate 111 of the display panel 100 using the adhesive layer 400.

As above, when the bracket 140 is attached to the back surface of the back substrate 111 using the adhesive layer 400, a supporter such as a pem nut and a boss and a fastener such as a screw are not used to fasten the bracket 140 to the back substrate 111. Therefore, a fixing process may be simply performed, the manufacturing cost may be reduced, and the thickness of the display device may be reduced.

A groove 141 may be formed in one surface of the bracket 140 opposite the back substrate 111, so as to improve an adhesive strength between the bracket 140 and the back substrate 111. It may be preferable that the adhesive layer 400 is formed in the groove 141.

In this instance, because the groove 141 may prevent an adhesive material of the adhesive layer 400 from being discharged to the outside of the bracket 140, an attaching process may be easily performed.

As above, when the bracket 140 is attached to the back surface of the back substrate 111, the display panel 100 may include a portion W1A extending further than the adhesive layer 400 in a longitudinal direction of the display panel 100. Further, the display panel 100 may include a portion W1 extending further than the bracket 140 in the longitudinal direction.

The shape of the bracket 140 may be variously changed.

Figure 32:
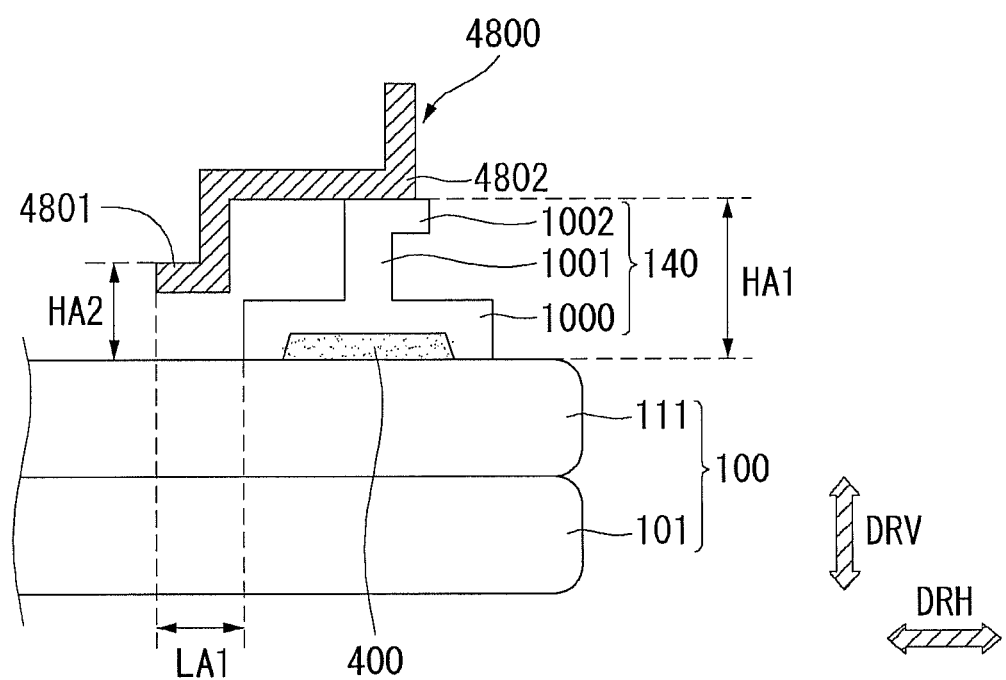

For example, as shown in FIG. 32, the bracket 140 may include a base 1000, a head 1002, and a pillar 1001 for connecting the base 1000 to the head 1002. The adhesive layer 400 may be disposed between the base 1000 of the bracket 140 and the back substrate 111.

In other words, the bracket 140 has a depression (or groove) on a first surface where the adhesive layer 400 is applied. The bracket 140 has a first protrusion 1001 (i.e., the pillar) extending from a second surface opposite the first surface and a second protrusion (i.e., the head) 1002 extending from the first protrusion 1001. The first protrusion 1001 of the bracket 140 may extend away from the back substrate 111 in a width direction (i.e., a vertical direction DRV) of the back substrate 111. The second protrusion 1002 may extend from an end of the first protrusion 1001 in a horizontal direction DRH of the display panel such that the first and second protrusions 1001 and 1002 may form an inverted L-shape.

A width of the base 1000 providing a space for the adhesive layer 400 may be greater than a width of the head 1002.

Hereinafter, the embodiment of the invention is described on the assumption that the bracket 140 includes the base 1000, the head 1002, and the pillar 1001. Other structures of the bracket 140 may be used.

As shown in FIG. 32, an auxiliary bracket 4800 may be disposed on the bracket 140. More specifically, the auxiliary bracket 4800 may be disposed on the head 1002 of the bracket 140. In the embodiment disclosed herein, the bracket 140 may be referred to as a first bracket, and the auxiliary bracket 4800 may be referred to as a second bracket or a sheet supporter.

Further, the auxiliary bracket 4800 may include a portion 4801 positioned close to the back substrate 111. Hereinafter, the portion 4801 of the auxiliary bracket 4800 is referred to as the low altitude part 4801.

More specifically, when the height of the bracket 140 is measured from the back surface of the back substrate 111, a height HA2 of the low altitude part 4801 of the auxiliary bracket 4800 may be less than a maximum height HA1 of the bracket 140.

The low altitude part 4801 of the auxiliary bracket 4800 may extend further than the bracket 140 toward the middle direction of the display panel 100 by a predetermined distance LA1.

In other words, at least one auxiliary bracket 4800 may be provided adjacent to the plurality of brackets 140.

The at least one auxiliary bracket 4800 includes a first ledge 4802 and a second ledge 4801 extending in the horizontal direction DRH. The first and second ledges 4802 and 4801 may be spaced from each other by an extension (not shown) extending in the vertical direction DRV, the extension being coupled to ends of the first and second ledges 4802 and 4801.

In this instance, the first ledge 4802 may be provided between the second protrusion 1002 and the frame (not shown) and may contact the frame. These are described in detail below.

Figure 33:
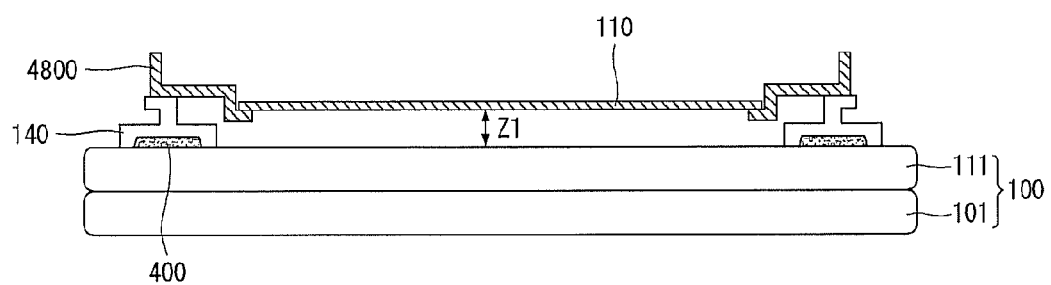

As shown in FIG. 33, the optical sheet part 110 between the display panel 100 and the back cover may be disposed on the auxiliary bracket 4800. For example, the optical sheet part 110 may be disposed on the low altitude part 4801 of the auxiliary bracket 4800.

The optical sheet part 110 may not be fixed to the auxiliary bracket 4800 and may be placed on the low altitude part 4801 of the auxiliary bracket 4800. In this instance, the optical sheet part 110 may move on the auxiliary bracket 4800.

As above, when the optical sheet part 110 is disposed on the auxiliary bracket 4800, the optical sheet part 110 may be separated from the back substrate 111 by a predetermined distance Z1. Hence, an air gap may be formed between the back substrate 111 and the optical sheet part 110.

As above, when the air gap is formed between the back substrate 111 and the optical sheet part 110, the optical characteristics of the display device may be improved by the air gap.

In the embodiment of the invention, the structure and the shape of the auxiliary bracket 4800 may be variously changed.

Figure 34:
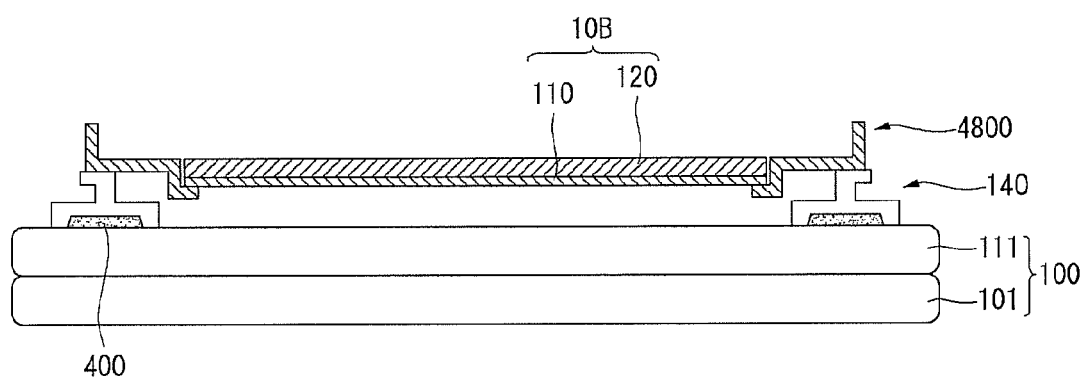

As shown in FIG. 34, the light source part 120 may be disposed on the optical sheet part 110. The light source part 120 may be disposed on the low altitude part 4801 of the auxiliary bracket 4800 along with the optical sheet part 110. In this instance, the backlight unit 10B has the direct type light source part 120.

Figure 35:
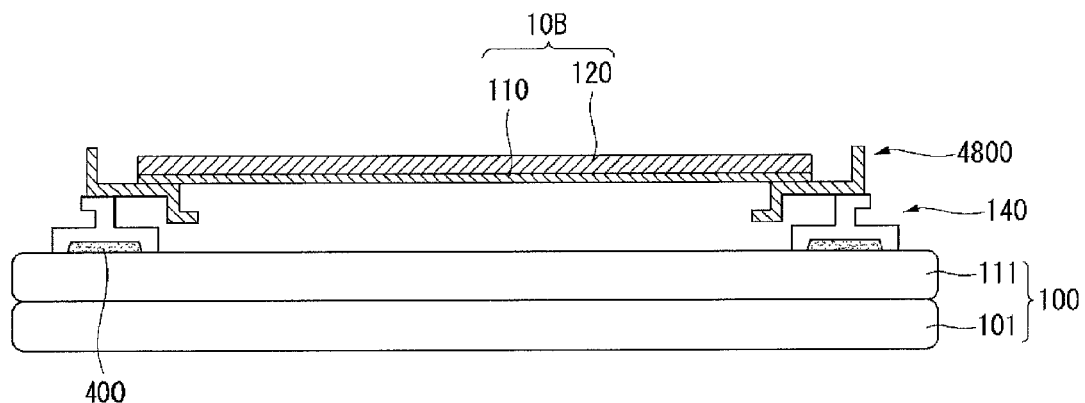

Alternatively, as shown in FIG. 35, the optical sheet part 110 may be disposed on the first ledge 4802 of the auxiliary bracket 4800.

Figure 36:
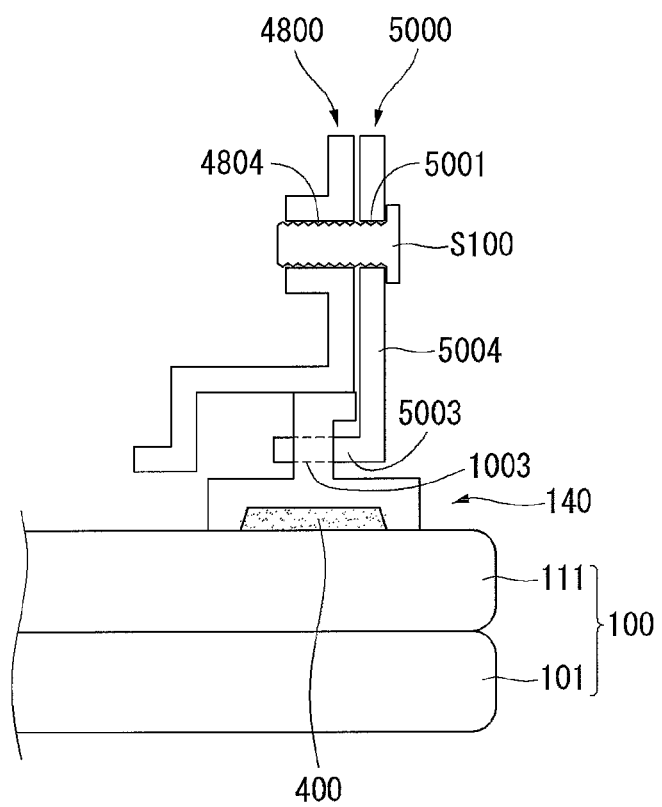

As shown in FIG. 36, a hole (or opening) 1003 may be formed in the bracket 140.

A connection frame 5000 may be connected to the bracket 140 through the hole 1003. The connection frame 5000 may not be fixed to the bracket 140, and a portion of the connection frame 5000 may be inserted into the hole 1003 of the bracket 140. Hence, an external pressure, for example, a twist transferred to the connection frame 5000 may be prevented from being transferred to the display panel 100 through the bracket 140, and a light leakage phenomenon may be further reduced.

In this instance, the auxiliary bracket 4800 may be provided adjacent to the plurality of brackets 140 and may be connected to the at least one connection frame 5000.

In other words, the connection frame 5000 has a side wall 5004 and a plurality of first tab portions 5003 extending in the horizontal direction DRH. The first tab portion 5003 may pass through the hole 1003 of the first protrusion of the bracket 140.

In this instance, a width of the first tab portion 5003 in the horizontal direction DRH may be greater than a width of the second protrusion of the bracket 140.

A hole 5001 may be formed in the connection frame 5000, and a hole 4804 corresponding to the hole 5001 of the connection frame 5000 may be formed in the auxiliary bracket 4800. A fastening member 5100 such as a screw may connect the connection frame 5000 to the auxiliary bracket 4800 through the hole 5001 of the connection frame 5000 and the hole 4804 of the auxiliary bracket 4800. In other words, the connection frame 5000 may include the first tab portion 5003 inserted into a hole (or a groove) 1003 of the bracket 140 and the side wall 5004 fastened to the auxiliary bracket 4800.

The first tab portion 5003 of the connection frame 5000 may be a horizontal portion, and the side wall 5004 of the connection frame 5000 may be a vertical portion.

Figure 37:
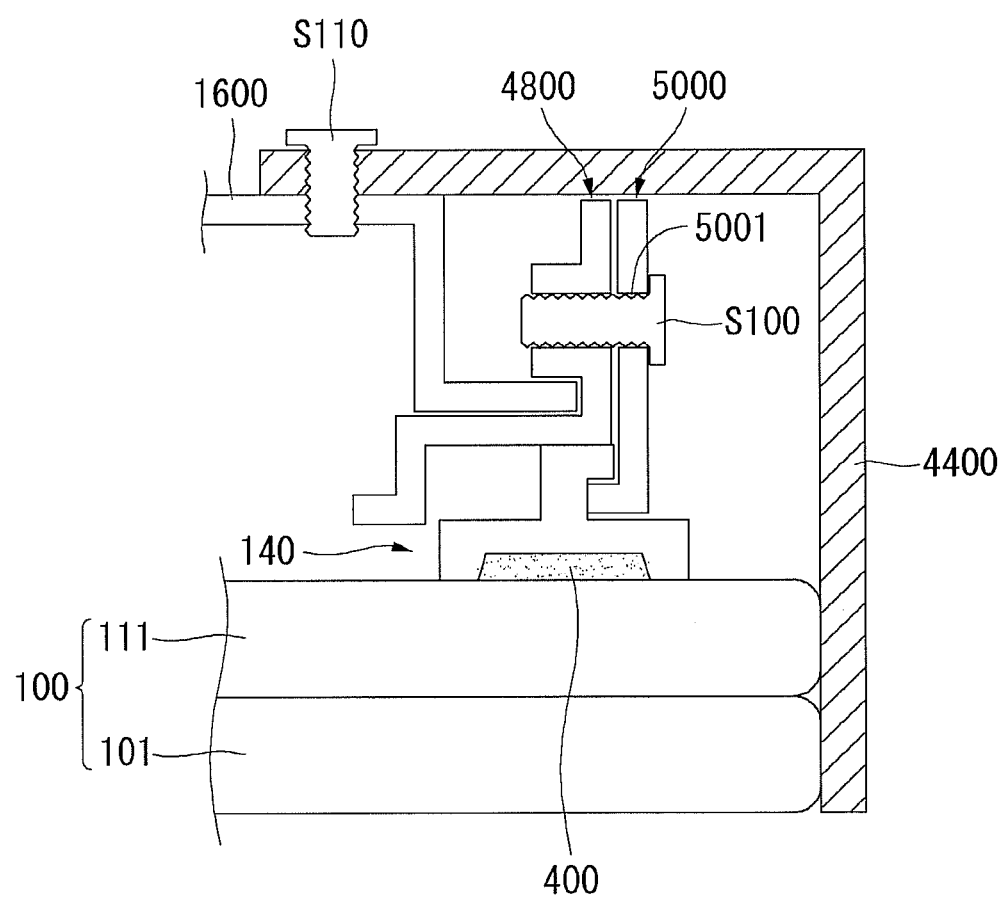

As shown in FIG. 37, a frame 1600 may be disposed between the back cover 130 and the display panel 100. The frame 1600 may include a portion positioned on the auxiliary bracket 4800. In the embodiment disclosed herein, the frame 1600 may be a frame included in the backlight unit or a frame separate from the backlight unit.

An end of the frame 1600 is positioned on the auxiliary bracket 4800. A portion of the frame 1600 may contact the auxiliary bracket 4800.

A side cover 4400 including a portion positioned on the side of the display panel 100 may be connected to the frame 1600.

For example, a predetermined fastening member S110 such as a screw may connect the frame 1600 to the side cover 4400.

The side cover 4400 may prevent a foreign material such as dust from being penetrated into the display device and may protect the side of the display panel 100 from a damage.

Figure 38:
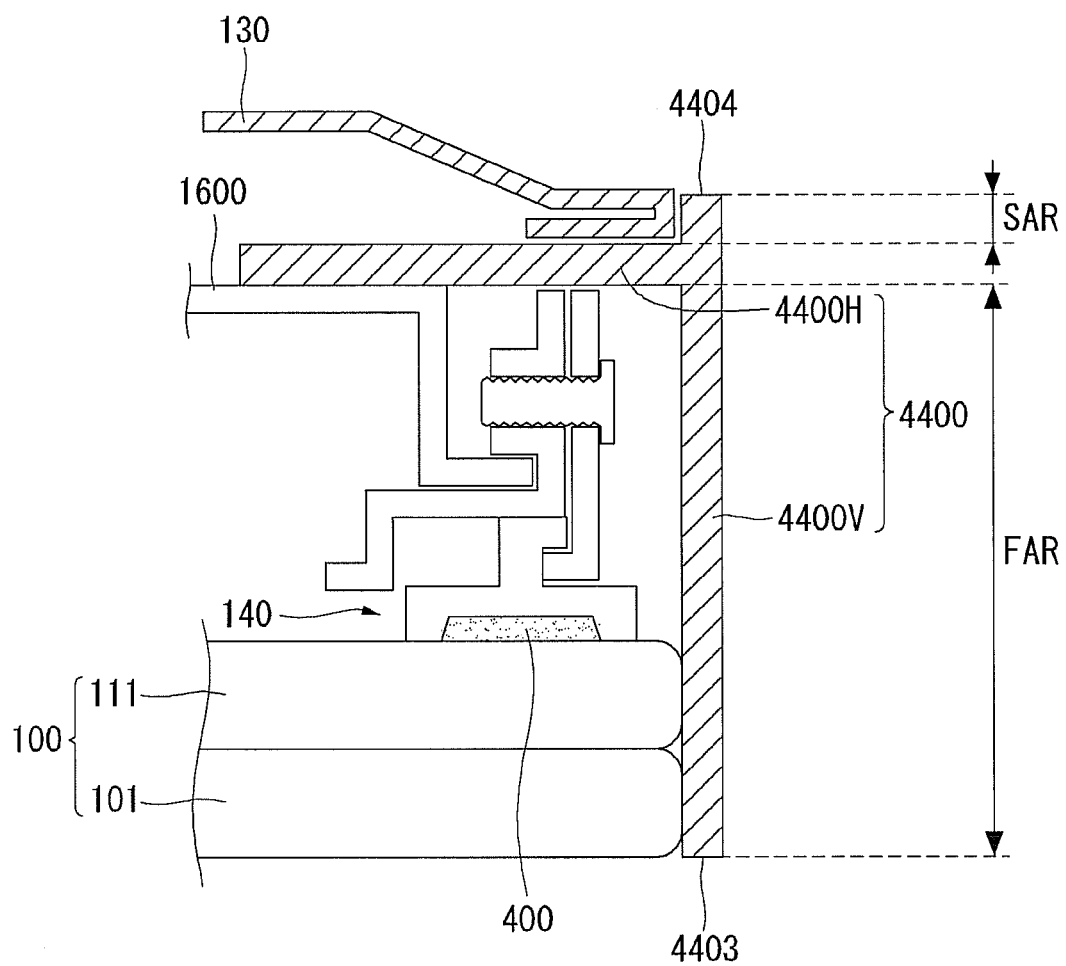

As shown in FIG. 38, the back cover 130 is disposed in the rear of the display panel 100 and may be connected to the side cover 4400.

A portion of the side cover 4400 may extend in the direction toward the middle of the display panel 100, so as to more efficiently fix the side cover 4400.

In this instance, the side cover 4400 may include a portion positioned between the back cover 130 and the display panel 100 in a width direction (i.e., a vertical direction) of the display panel 100.

As above, an edge of the front surface of the display panel 100 may be exposed in a state where the back cover 130 is connected to the side cover 4400. The exposure of the edge of the front surface of the display panel 100 may indicate that an edge of a front surface of a front polarizing film attached to the front substrate 101 is exposed. Alternatively, the exposure of the edge of the front surface of the display panel 100 may indicate that an edge of the front surface of the front substrate 101 is exposed.

In this instance, when the observer in the front of the display panel 100, for example, at a predetermined first position views the display panel 100, the observer may substantially observe the entire area of the display panel 100. Therefore, an attractive appearance of the display panel 100 may be provided. Further, because another edge of the side of the display panel 100 may not be shown to the observer, a visual effect, in which the observer may feel that the screen size of the display panel 100 is greater than the real screen size of the display panel 100, may be obtained.

In other words, the side cover 4400 may include a sidewall 4400V and an overhang portion 4400H extending in the horizontal direction DRH. A first end portion 4403 of the side cover 4400 may cover the sides of the front and back substrates 101 and 111. The overhang portion 4400H may be provided at a second end portion 4404 of the side cover 4400. The overhang portion 4400H may be separated from an end of the side cover 4400 by a predetermined distance in the vertical direction DRV. In this instance, the side cover 4400 may provide a rim for preventing the detachment of the back cover 130.

In other words, the overhang portion 4400H may be provided between the first end portion 4403 and the second end portion 4404 of the side cover 4400 and may be separated from the first end portion 4403 and the second end portion 4404 by a predetermined distance. An end of the back cover 130 may be positioned adjacent to a joint between the sidewall 4400V and the overhang portion 4400H.

The sidewall 4400V may be referred to as a first portion or a vertical portion of the side cover 4400, and the overhang portion 4400H may be referred to as a second portion or a horizontal portion of the side cover 4400.

In other words, the sidewall 4400V of the side cover 4400 may include a first area FAR between the first end portion 4403 and the second end portion 4404 and a second area SAR between the second end portion 4404 and the overhang portion 4400H. An end of the back cover 130 may be positioned in the second area SAR. In this instance, the backlight unit 10B and the display panel 100 may be positioned adjacent to the first area FAR.

Figure 39:
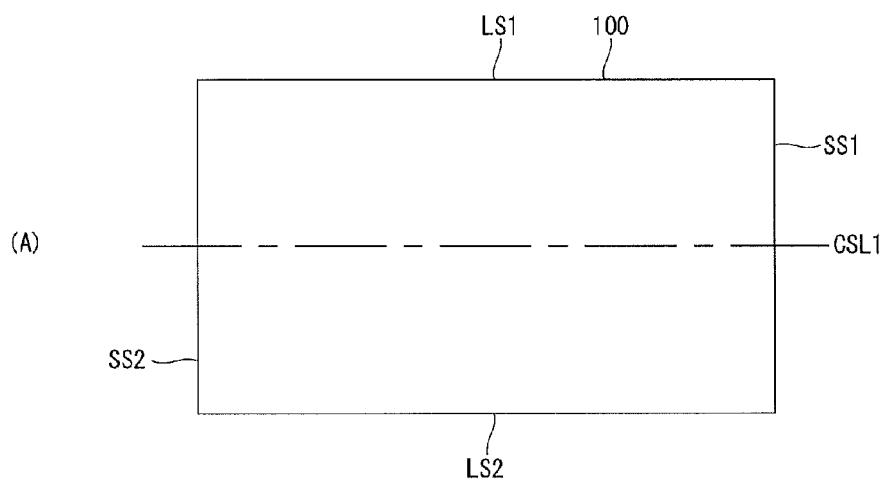
Figure 39:
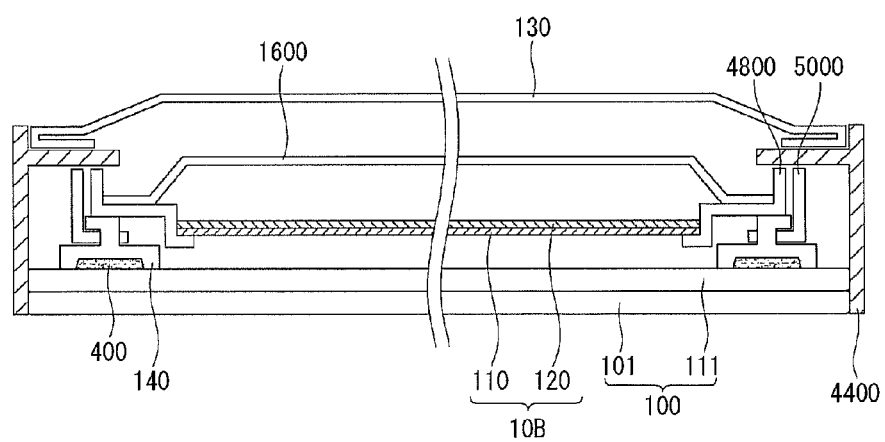

In (A) of FIG. 39 showing a cross section taken along a straight line CSL1 passing through first and second short sides SS1 and SS2 of the display panel 100, more specifically, as shown in (B) of FIG. 39, the side cover 4400 is disposed at each of both ends of the display device, and the back cover 130 is disposed in the rear of the display panel 100.

FIG. 39 is a schematic cross-sectional view of the display device according to the embodiment of the invention in the vertical direction. In the following description, the descriptions of the configuration and the structure described above are omitted.

Figure 40:
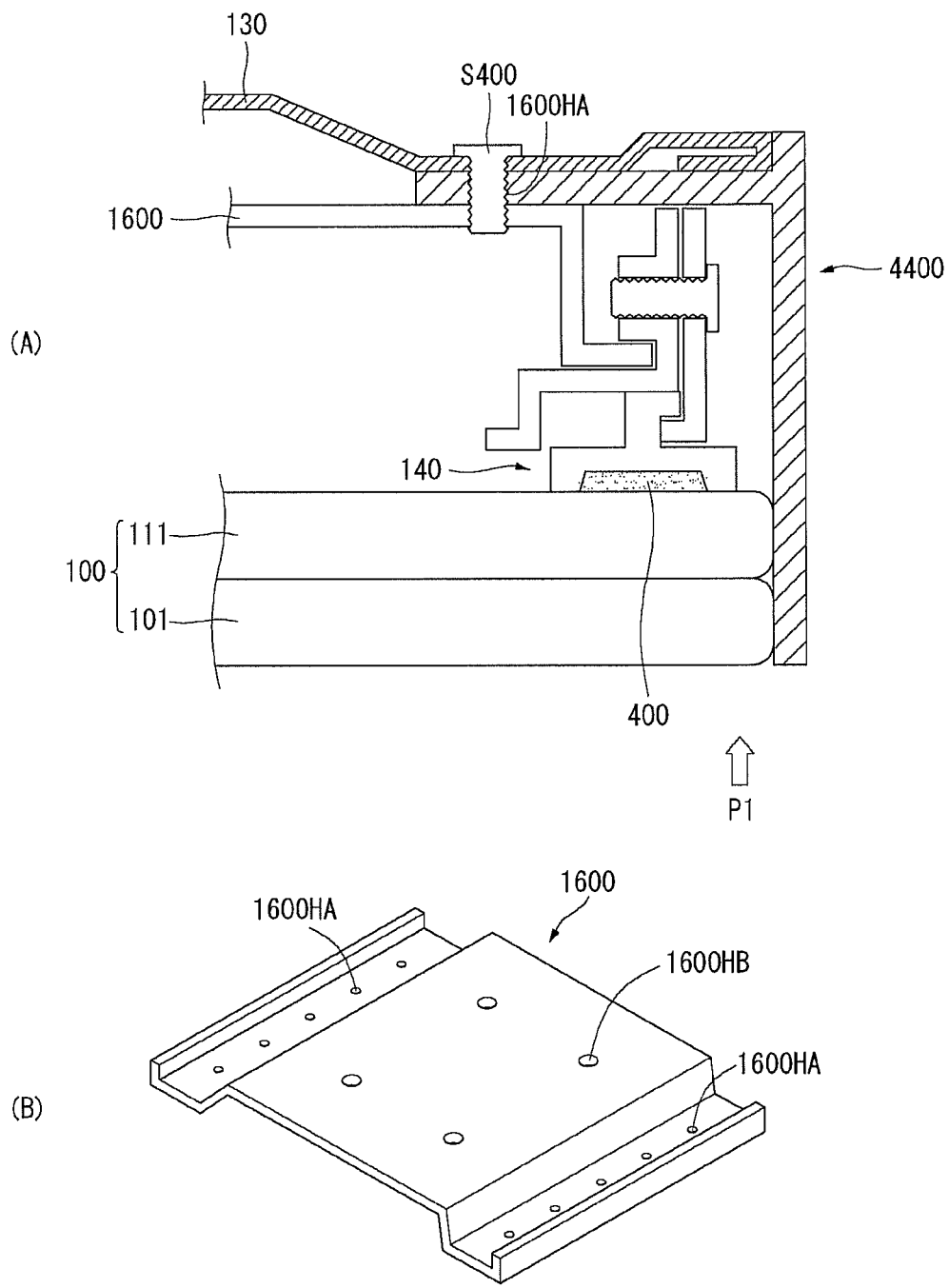

Alternatively, as shown in FIG. 40, the back cover 130, the side cover 4400, and the frame 1600 may be fastened to one another using a fastening member S400.

In this instance, the back cover 130, the side cover 4400, and the frame 1600 may be electrically connected to one another using the fastening member 5400. As a result, electromagnetic interference (EMI) may be reduced.

As shown in (B) of FIG. 40, the frame 1600 may have at least one hole. For example, the frame 1600 may have at least one first hole 1600HA and at least one second hole 1600HB.

As shown in (A) of FIG. 40, the first hole 1600HA may correspond to the fastening member S400 for fastening the frame 1600 to the back cover 130 and the side cover 4400. The second hole 1600HB may be used to fasten the frame 1600 to a predetermined structure, for example, the back cover 130 or may be used as a hole through which another structure passes.

Figure 41:
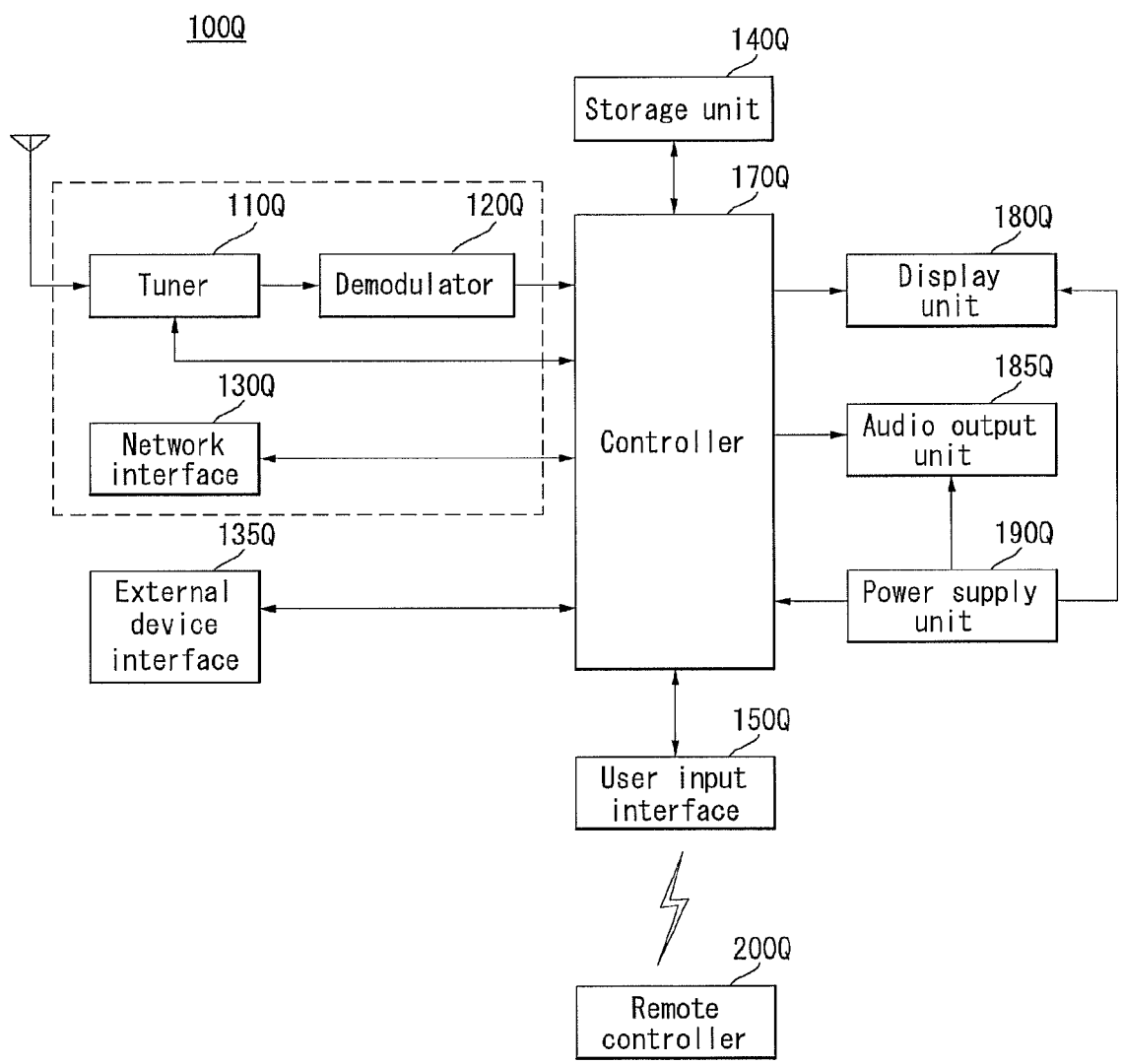
FIG. 41 illustrates configuration and an operation of a display device according to an example embodiment of the invention.

FIG. 41 illustrates another configuration of the display device according to the example embodiment of the invention. In the following description, the descriptions of the configuration and the structure described above are omitted. Hereinafter, a broadcasting signal receiver is used as an electronic device, to which the display device according to the embodiment of the invention is applied. The display device according to the embodiment of the invention may be applied to other electronic devices such as cell phones.

A display unit 180Q shown in FIG. 41 may correspond to the display device shown in FIGS. 1 to 40. Thus, the display device according to the embodiment of the invention may be referred to as the display unit 180Q shown in FIG. 41.

As shown in FIG. 41, a broadcasting signal receiver 100Q according to the embodiment of the invention may include a broadcasting receiving unit 105Q, an external device interface 135Q, a storage unit 140Q, a user input interface 150Q, a controller 170Q, a display unit 180Q, an audio output unit 185Q, a power supply unit 190Q, and a photographing unit (not shown). The broadcasting receiving unit 105Q may include a tuner 110Q, a demodulator 120Q, and a network interface 130Q.

If necessary, the broadcasting signal receiver 100Q may be designed so that it includes the tuner 110Q and the demodulator 120Q and does not include the network interface 130Q. On the contrary, the broadcasting signal receiver 100Q may be designed so that it includes the network interface 130Q and does not include the tuner 110Q and the demodulator 120Q.

The tuner 110Q tunes a radio frequency (RF) broadcasting signal, which corresponds to a channel selected by the user or all of previously stored channels, among RF broadcasting signals received through an antenna. Further, the tuner 110Q converts the tuned RF broadcasting signal into a middle frequency signal, a base band image signal, or a voice signal.

The demodulator 120Q receives a digital IF signal converted by the tuner 110Q and performs a demodulating operation.

A stream signal output by the demodulator 120Q may be input to the controller 170Q. The controller 170Q performs demultiplexing, image/voice signal processing, etc. Then, the controller 170Q outputs an image to the display unit 180Q and outputs a voice to the audio output unit 185Q.

The external device interface 135Q may connect an external device to the broadcasting signal receiver 100Q. For this, the external device interface 135Q may include an audio-visual (AV) input/output unit (not shown) or a wireless communication unit (not shown).

The network interface 130Q provides an interface for connecting the broadcasting signal receiver 100Q to a wired/wireless network including an internet network. The network interface 130Q may correspond to the wireless communication unit, which was described in detail above.

The storage unit 140Q may store a program for the signal processing of the controller 170Q and the control operation of the controller 170Q or may store the processed image signal, the processed voice signal, or a data signal.

The user input interface 150Q may transfer the signal the user inputs to the controller 170Q, or may transfer the signal from the controller 170Q to the user.

For example, the user input interface 150Q may receive and process the control signal indicating the turn-on or turn-off operation, the channel selection, the screen setting, etc. from a remote controller 200Q based on various communication manners such as a RF communication manner and an infrared communication manner. Alternatively, the user input interface 150Q may operate so that the control signal from the controller 170Q is transmitted to the remote controller 200Q.

For example, the user input interface 150Q may transfer a control signal, which is input from a power key, a channel key, a volume key, a local key, etc., to the controller 170Q.

The controller 170Q may perform the demultiplexing processing on the stream input through the tuner 110Q, the demodulator 120Q, or the external device interface 135Q or may perform the processing of demultiplexed signals, thereby generating or outputting the signals for outputting the image or the voice.

The image signal processed by the controller 170Q may be input to the display unit 180Q and may display an image corresponding to the image signal. Further, the image signal processed by the controller 170Q may be input to an external output device through the external device interface 135Q.

The voice signal processed by the controller 170Q may be output to the audio output unit 185Q. Further, the voice signal processed by the controller 170Q may be input to the external output device through the external device interface 135Q.

The controller 170Q may control the entire operation of the broadcasting signal receiver 100Q. For example, the controller 170Q may control the tuner 110Q, so that the tuner 110Q tunes a RF broadcasting signal corresponding to a channel selected by the user or a previously stored channel.

The controller 170Q may control the broadcasting signal receiver 100Q using a user command or an internal program input through the user input interface 150Q.

The display unit 180Q may convert the image signal, the data signal, and an OSD signal, which are processed by the controller 170Q, or the image signal and the data signal which are received from the external device interface 135Q, into red, green, and blue signals and may generate a driving signal.

The audio output unit 185Q may receive the voice signal (for example, stereo signal, 3.1 channel signal, or 5.1 channel signal) processed by the controller 170Q and may output the voice.

The power supply unit 190Q supplies the power required in all of the components of the broadcasting signal receiver 100Q.

The remote controller 200Q transmits the user command the user inputs to the user input interface 150Q. For this, the remote controller 200Q may use Bluetooth, RF communication, infrared communication, Ultra-wideband (UWB), Zigbee, etc.

The remote controller 200Q may receive the image, the voice, or the data signal output from the user input interface 150Q and may display the image, the voice, or the data signal or may output the voice or the vibration.

The broadcasting signal receiver 100Q may not include the tuner 110Q and the demodulator 120Q. Further, the broadcasting signal receiver 100Q may receive image contents through the network interface 130Q or the external device interface 135Q and may reproduce the image contents.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
 a substrate part including a plurality of substrates; and
 a plurality of light sources provided on each of the plurality of substrates,
 wherein a transverse width and a longitudinal width of at least one of the plurality of substrates are different from a transverse width and a longitudinal width of at least one of the remaining substrates, respectively,
 wherein the plurality of light sources are selectively turned on or turned off according to an individual driving of the plurality of substrates corresponding to a ratio of screen included in a video signal,
 wherein a ratio of a transverse width to a longitudinal width of the substrate part is 16:9, and
 wherein the substrate part includes:
  a first substrate positioned at a first corner of the substrate part, a second substrate positioned at a second corner of the substrate part, a third substrate positioned at a third corner of the substrate part, a fourth substrate positioned at a fourth corner of the substrate part,
  a fifth substrate positioned between the first substrate and the second substrate, a sixth substrate positioned between the third substrate and the fourth substrate, a seventh substrate positioned between the first substrate and the third substrate, an eighth substrate positioned between the second substrate and the fourth substrate, and
  a ninth substrate positioned between the fifth substrate, the sixth substrate, the seventh substrate, and the eighth substrate.

2. The backlight unit of claim 1, wherein the number of light sources provided on at least one of the plurality of substrates is different from the number of light sources provided on at least one of the remaining substrates.

3. The backlight unit of claim 2, wherein each of the first substrate, the second substrate, the third substrate, and the fourth substrate has the minimum number of light sources among the plurality of substrates.

4. The backlight unit of claim 1, wherein the light sources are arranged on one substrate of the plurality of substrates in A×B matrix form, where A and B are natural numbers,
 wherein the light sources are arranged on another substrate of the plurality of substrates in C×D matrix form, where C is a natural number different from 'A' and D is a natural number different from 'B'.

5. The backlight unit of claim 4, wherein the number of light sources provided on the one substrate is the same as the number of light sources provided on the other substrate.

6. The backlight unit of claim 1, wherein the number of light sources provided on the ninth substrate is more than the number of light sources provided on each of the first to eighth substrates.

7. The backlight unit of claim 1, wherein the ninth substrate is divided into a plurality of sub-substrates, and at least one light source is provided on each of the plurality of sub-substrates.

8. The backlight unit of claim 7, wherein the number of light sources provided on at least one of the plurality of sub-substrates is different from the number of light sources provided on at least one of the remaining sub-substrates.

9. The backlight unit of claim 1,
 wherein a ratio of a transverse width to a longitudinal width of the substrate part is 21:9 in a state where the first to sixth substrates are removed from the substrate part, and
 wherein a ratio of a transverse width to a longitudinal width of the substrate part is 4:3 in a state where the first to fourth substrates and the seventh to eighth substrates are removed from the substrate part.

10. The backlight unit of claim 1, wherein when video data having a screen ratio of a transverse length to a longitudinal length of 4:3 is supplied to the backlight unit, the first to fourth substrates and the seventh to eighth substrates are turned off, and
 wherein when video data having a screen ratio of a transverse length to a longitudinal length of 21:9 is supplied to the backlight unit, the first to sixth substrates are turned off.

11. A display device comprising:
 a display panel configured to display an image;
 a backlight unit positioned in the rear of the display panel; and
 a back cover positioned in the rear of the backlight unit,
 wherein the backlight unit includes:
  a substrate part including a plurality of substrates, and
  a plurality of light sources provided on each of the plurality of substrates,
 wherein a transverse width and a longitudinal width of at least one of the plurality of substrates are different from a transverse width and a longitudinal width of at least one of the remaining substrates, respectively, and
 wherein the plurality of light sources are selectively turned on or turned off according to an individual driving of the plurality of substrates corresponding to a ratio of screen included in a video signal,
 wherein a ratio of a transverse width to a longitudinal width of the substrate part is 16:9, and
 wherein the substrate part includes:
  a first substrate positioned at a first corner of the substrate part, a second substrate positioned at a second corner of the substrate part, a third substrate positioned at a third corner of the substrate part, a fourth substrate positioned at a fourth corner of the substrate part,
  a fifth substrate positioned between the first substrate and the second substrate, a sixth substrate positioned between the third substrate and the fourth substrate, a seventh substrate positioned between the first substrate and the third substrate, an eighth substrate positioned between the second substrate and the fourth substrate, and
  a ninth substrate positioned between the fifth substrate, the sixth substrate, the seventh substrate, and the eighth substrate.

12. The display device of claim 11, wherein the number of light sources provided on at least one of the plurality of substrates is different from the number of light sources provided on at least one of the remaining substrates.

13. The display device of claim 11, wherein the number of light sources provided on the ninth substrate is more than the number of light sources provided on each of the first to eighth substrates.

14. The display device of claim 11, wherein the ninth substrate is divided into a plurality of sub-substrates, and at least one light source is provided on each of the plurality of sub-substrates.

15. The display device of claim 14, wherein the number of light sources provided on at least one of the plurality of sub-substrates is different from the number of light sources provided on at least one of the remaining sub-substrates.

16. The display device of claim 11, wherein a ratio of a transverse width to a longitudinal width of the substrate part is 21:9 in a state where the first to sixth substrates are removed from the substrate part, and wherein a ratio of a transverse width to a longitudinal width of the substrate part is 4:3 in a state where the first to fourth substrates and the seventh to eighth substrates are removed from the substrate part.

17. The display device of claim 11, wherein when video data having a screen ratio of a transverse length to a longitudinal length of 4:3 is supplied to the display panel, the first to fourth substrates and the seventh to eighth substrates are turned off, and wherein when video data having a screen ratio of a transverse length to a longitudinal length of 21:9 is supplied to the display panel, the first to sixth substrates are turned off.

\* \* \* \* \*